United States Patent
Tai et al.

(10) Patent No.: US 7,027,779 B2
(45) Date of Patent: Apr. 11, 2006

(54) LAMINATED-TYPE HIGH-FREQUENCY SWITCH MODULE

(75) Inventors: Hiroyuki Tai, Tottori-ken (JP); Shigeru Kemmochi, Saitama-ken (JP); Mitsuhiro Watanabe, Tottori-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 546 days.

(21) Appl. No.: 10/362,233

(22) PCT Filed: Aug. 22, 2001

(86) PCT No.: PCT/JP01/07186

§ 371 (c)(1),
(2), (4) Date: Feb. 21, 2003

(87) PCT Pub. No.: WO02/17504

PCT Pub. Date: Feb. 28, 2002

(65) Prior Publication Data

US 2003/0171098 A1 Sep. 11, 2003

(30) Foreign Application Priority Data

Aug. 22, 2000 (JP) .............................. 2000-250702

(51) Int. Cl.
*H04B 1/44* (2006.01)

(52) U.S. Cl. .......................... 455/83; 455/78; 455/553; 333/132; 333/101

(58) Field of Classification Search .................. 455/83, 455/78, 82, 553; 333/132, 101, 126, 143, 333/193
See application file for complete search history.

(56) References Cited

U.S. PATENT DOCUMENTS

| | | | | |
|---|---|---|---|---|
| 5,473,293 | A | * 12/1995 | Chigodo et al. | ............ 333/104 |
| 5,507,011 | A | * 4/1996 | Chigodo et al. | ............... 455/82 |
| 6,606,015 | B1 | * 8/2003 | Uriu et al. | ................... 333/132 |
| 6,683,512 | B1 | * 1/2004 | Nakamata et al. | .......... 333/126 |

(Continued)

FOREIGN PATENT DOCUMENTS

EP       0 785 590 A1    7/1997

(Continued)

OTHER PUBLICATIONS

T. Hideaki et al., "Coupler Containing Low Pass Filter", Patent Abstracts of Japan of JP 11-220312 A, Aug. 10, 1999.

(Continued)

*Primary Examiner*—Quochien B. Vuong
*Assistant Examiner*—Minh D. Dao
(74) *Attorney, Agent, or Firm*—Finnegan, Henderson, Farabow, Garrett & Dunner LLP

(57) ABSTRACT

A laminated high-frequency switch module for selecting either a transmission circuit or a reception circuit of each of transmission/reception systems by switching, comprising a demultiplexer for demultiplexing signals of the transmission/reception systems, high-frequency switch circuits for selecting either the signal path of a reception signal from the demultiplexer to the reception circuit or the signal path of a transmission signal from the transmission circuit to the demultiplexer, and circuit for measuring the power of the transmission signal from the transmission circuit, characterized in that the laminate is composed of dielectric layers having electrode patterns, and the demultiplexer, the high-frequency switch circuits, and the power measuring circuit are constituted of electrode patterns in the laminate.

30 Claims, 16 Drawing Sheets

U.S. PATENT DOCUMENTS

| | | | |
|---|---|---|---|
| 6,867,662 B1* | 3/2005 | Uriu et al. | 333/132 |
| 2002/0101296 A1* | 8/2002 | Uriu et al. | 333/132 |
| 2002/0183016 A1* | 12/2002 | Kemmochi et al. | 455/83 |
| 2005/0134402 A1* | 6/2005 | Uriu et al. | 333/133 |
| 2005/0221769 A1* | 10/2005 | Kemmochi et al. | 455/78 |

FOREIGN PATENT DOCUMENTS

| | | |
|---|---|---|
| EP | 0 837 516 A2 | 4/1998 |
| EP | 0 921 642 A2 | 6/1999 |
| JP | 11-225089 | 8/1999 |
| JP | 11-313003 | 11/1999 |

OTHER PUBLICATIONS

K. Shigeru et al., "Composite Switch Circuit Parts", Patent Abstracts of Japan of JP 10-276117 A, Oct. 13, 1998.

O. Akira et al., "MMIC Package", Patent Abstracts of Japan of JP 06-268532 A, Sep. 22, 1994.

* cited by examiner

LAMINATED-TYPE HIGH-FREQUENCY SWITCH MODULE

FIELD OF THE INVENTION

The present invention relates to a laminate-type, high-frequency switch module used in high-frequency bands such as microwave bands, for controlling signal lines between an antenna and transmission circuits and reception circuits in a plurality of transmitting/receiving systems, particularly to a laminate-type, high-frequency switch module having a function to detect the electric power of a transmission signal supplied from each transmission circuit.

BACKGROUND OF THE INVENTION

Wireless communications devices, for instance, mobile phones, have become popular remarkably in recent years with their functions and services improved increasingly. Explanation will be made on a mobile phone as an example. There are various systems for mobile phones, for instance, GSM (global system for mobile communications) and DCS1800 (digital cellular system 1800) systems widely used mostly in Europe, a PCS (personal communications services) system used in the U.S., and a PDC (personal digital cellular) system used in Japan. According to recent rapid expansion of mobile phones, however, a frequency band allocated, to each system cannot allow all users to use their mobile phones in major cities in advanced countries, resulting in difficulty in connection and thus causing such a problem that mobile phones are sometimes disconnected during communication. Thus, proposal was made to permit users to utilize a plurality of systems, thereby increasing substantially usable frequency, and further to expand serviceable territories and to effectively use communications infrastructure of each system. Thus, mobile phones adaptable to a plurality of systems are called multiband mobile phones, differentiated from single-band mobile phones adaptable to only a single system.

If a mobile phone is simply provided with circuits for every system to make one mobile phone adapted to a plurality of systems, every system has a transmitting system needing, for instance, a filter for passing a transmission signal of the desired transmission frequency, high-frequency switches for switching a transmission circuit and a reception circuit, and an antenna for receiving and emitting transmitting/receiving signals, and a receiving system needing a high-frequency circuit device such as a filter for passing a reception signal of the desired frequency among those passing the high-frequency switch. Accordingly, the mobile phone is not only expensive, but it also has increased volume and weight, whereby it is not suitable for mobile gears. Thus, to realize a mobile phone capable of handling a plurality of systems, miniaturized high-frequency circuit parts having multiple functions, which can be operated at frequencies for a plurality of systems, are required.

FIG. 25 is a block diagram showing the essential structure of transmission parts in such a multiband mobile phone. This multiband mobile phone comprises an antenna-sharing device for enabling a plurality of systems to be connected to one common antenna, and connected downstream of the antenna-sharing device are a plurality of directional couplers CPn, detecting diodes DKn, error amplifiers AEn, and high-frequency amplifiers PAn, etc. The output end of each directional coupler CPn is connected to the detecting diode DKn to control a transmission output level, such that the electric power of the detected transmission signal is adjusted to a targeted transmission output level. The gain of the high-frequency amplifier PAn is not constant in a frequency band of the system, but may vary depending on the ambient temperature and power supply voltage. Accordingly, every system is provided with a chip-type, directional coupler, so that connecting lines on a circuit board can provide an output proportional to the high-frequency signal to detect the output electric power of the high-frequency amplifier.

As described above, the conventional multiband mobile phones redundantly comprise parts such as directional couplers, detecting diodes, etc. for each system. Because these discrete parts are mounted onto the circuit board, the multiband mobile phones have large transmission parts, resulting in large overall size. In addition, because discrete parts are connected with lines on a circuit board, the characteristics of the transmission parts are deteriorated by the loss of the connecting lines. Further, serious problems with multiband mobile phones that should be miniaturized are increase in mounting areas because of the increased number of parts, the addition of parts such as capacitors, inductors, etc. for impedance matching between the parts, increase in insertion loss, etc.

OBJECT OF THE INVENTION

Accordingly, an object of the present invention is to provide a small, laminate-type, high-frequency switch module having an electric power detection function and an amplifier circuit with excellent high-frequency characteristics.

DISCLOSURE OF THE INVENTION

The laminate-type, high-frequency switch module for switching a transmission circuit and a reception circuit in each of a plurality of different transmitting/receiving systems according to the first embodiment of the present invention comprises a branching circuit for branching signals of a plurality of transmitting/receiving systems; a plurality of high-frequency switch circuits for switching a signal line for passing a reception signal sent from the branching circuit to the reception circuit, and a signal line for passing a transmission signal supplied from a transmission circuit to the branching circuit; and a means for detecting the electric power of a transmission signal supplied from each transmission circuit; the laminate being constituted by a plurality of dielectric layers each having an electrode pattern, and the branching circuit, the high-frequency switch circuits and the electric power-detecting means being constituted by the electrode patterns in the laminate.

The high-frequency switch circuit preferably comprises a diode, a first distributed constant line and a first capacitor as main elements, the branching circuit comprising a second distributed constant line and a second capacitor as main elements, the filter circuit comprising a third distributed constant line and a third capacitor as main elements, at least part of the first to third distributed constant lines and the first to third capacitors being constituted by electrode patterns in the laminate, and the diode being mounted onto a surface of the laminate.

The laminate-type, high-frequency switch module for switching a transmission circuit and a reception circuit in a plurality of different transmitting/receiving systems according to the second embodiment of the present invention comprises high-frequency switch circuits for switching signal lines in a plurality of transmitting/receiving systems; and further downstream of the high-frequency switch circuits, branching circuits for branching signals of a plurality of transmitting/receiving systems; branching circuits for synthesizing signals of a plurality of transmitting/receiving systems; and a means for detecting the electric power of a transmission signal sent from each transmission circuit; the laminate being constituted by a plurality of dielectric layers having electrode patterns, and the branching circuit, the high-frequency switch circuits and the electric power-detecting means being constituted by the electrode patterns in the laminate.

It is preferable that the high-frequency switch circuit functions to switch signal lines of a plurality of transmitting/receiving systems to a transmission line and a reception line, and that one branching circuit functions to transmit a reception signal to one of a plurality of receiving systems, while the other branching circuit functions to transmit a transmission signal sent from one operating transmitting system among a plurality of transmitting systems to the high-frequency switch circuit.

The high-frequency switch circuit comprises a field effect transistor as a main element, the field effect transistor being preferably mounted onto a surface of the laminate.

In the first and second embodiments, there is a filter circuit in a signal line for passing a transmission signal sent from the transmission circuit to an antenna.

The electric power-detecting means is preferably a directional coupling circuit or a capacitance-coupling circuit.

In the first and second embodiments, the directional coupling circuit comprises a fourth distributed constant line as a main element, at least part of the fourth distributed constant line being preferably constituted by the electrode patterns in the laminate. The fourth distributed constant line is preferably constituted by a main line disposed in a signal line for passing a transmission signal sent from the transmission circuit to the branching circuit, and a sub-line disposed in parallel with or in opposite to the main line. The main line may be constituted by the third distributed constant line of the filter circuit.

In the first and second embodiments, the capacitance-coupling circuit preferably comprises a fifth capacitor as a main element, at least part of the fifth capacitor being preferably constituted by the electrode patterns in the laminate. The fifth capacitor is preferably disposed in parallel with a signal line for passing a transmission signal sent from the transmission circuit to the branching circuit.

In the first and second embodiments, the high-frequency amplifier, the variable gain amplifier and the automatic gain control circuit are preferably integrally contained in the laminate. In this laminate-type, high-frequency switch module, the automatic gain control circuit compares the detection result of the electric power of the transmission signal by the directional coupling circuit or the capacitance-coupling circuit with electric power to be transmitted, to increase or decrease the gain of the variable gain amplifier based on the comparison result. The automatic gain control circuit comprises a detector and an error amplifier, one error amplifier being shared by a plurality of transmitting/receiving systems.

The high-frequency amplifier preferably comprises an amplifier circuit having a transistor, an input-matching circuit connected to the input side of the amplifier circuit, an output-matching circuit connected to the output side of the amplifier circuit, each of the input-matching circuit and the output-matching circuit comprising a capacitor and an inductor, the transistor in the amplifier circuit being mounted onto a surface of the laminate. At least part of the inductor is preferably formed as a distributed constant line in the laminate. At least part of the capacitor is constituted by capacitor electrodes opposing via the dielectric layer in the laminate. A transistor of the amplifier circuit is preferably a field effect transistor.

BEST MODE FOR CARRYING OUT THE INVENTION

The preferred embodiments of the present invention are explained in detail below referring to the attached figures. For the simplicity of explanation, a GSM (transmission frequency: 880–915 MHz, reception frequency: 925–960 MHz) system as a first transmitting/receiving system, a DCS 1800 (transmission frequency: 1710–1785 MHz, reception frequency: 1805–1880 MHz) system as a second transmitting/receiving system are taken as examples, though the present invention, of course, is applicable to other communications systems. For instance, the present invention is also applicable to other communication systems such as PCS (transmission frequency: 1850–1910 MHz, reception frequency: 1930–1990 MHz), etc. Further, the present invention is, of course, applicable to a laminate-type, high-frequency switch module having a multiband system comprising a TDMA (time division multiple access) system and a CDMA (code division multiple access) system such as a W-CDMA (wideband CDMA).

[1] Structure of Laminate-Type, High-Frequency Switch Module

Figure 1:
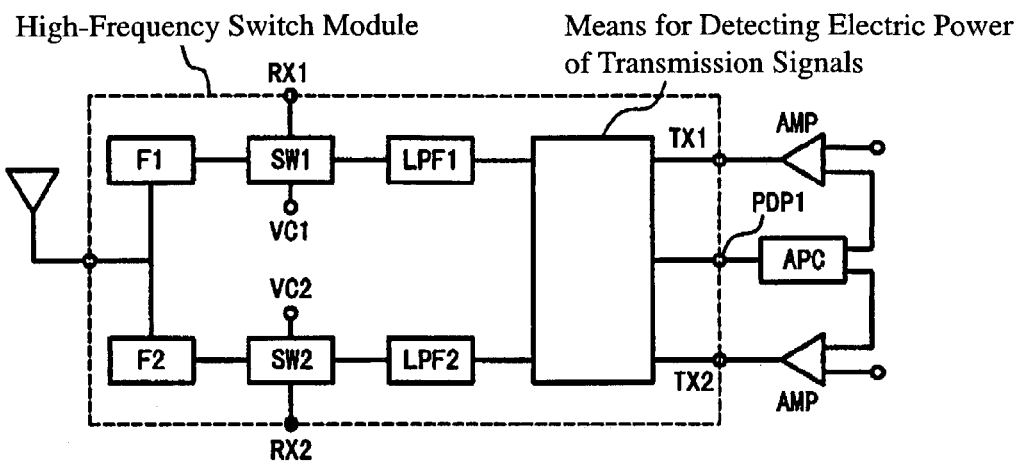
FIG. 1 is a block diagram showing one example of the laminate-type, high-frequency switch module circuit of the present invention.

FIG. 1 shows a laminate-type, high-frequency switch module according to one embodiment of the present invention. This laminate-type, high-frequency switch module comprises a branching circuit comprising first and second filter circuits F1, F2 for dividing a signal introduced into an antenna ANT to a reception signal to the first transmitting/receiving system and a reception signal to the second transmitting/receiving system; a first switch circuit SW1 disposed downstream of the first filter circuit F1 for switching a transmission circuit TX1 and a reception circuit RX1 in the first transmitting/receiving system by voltage applied from a control circuit VC1; a second switch circuit SW2 disposed downstream of the second filter circuit F2 for switching a transmission circuit TX2 in the second transmitting/receiving system, and a reception circuit RX2 in the second transmitting/receiving system by voltage applied from a control circuit VC2; a means for detecting the electric power of a transmission signal supplied from each transmission circuit; and a variable gain amplifier circuit. A directional coupling circuit or a capacitance-coupling circuit is preferable as the electric power-detecting means.

Figure 2:
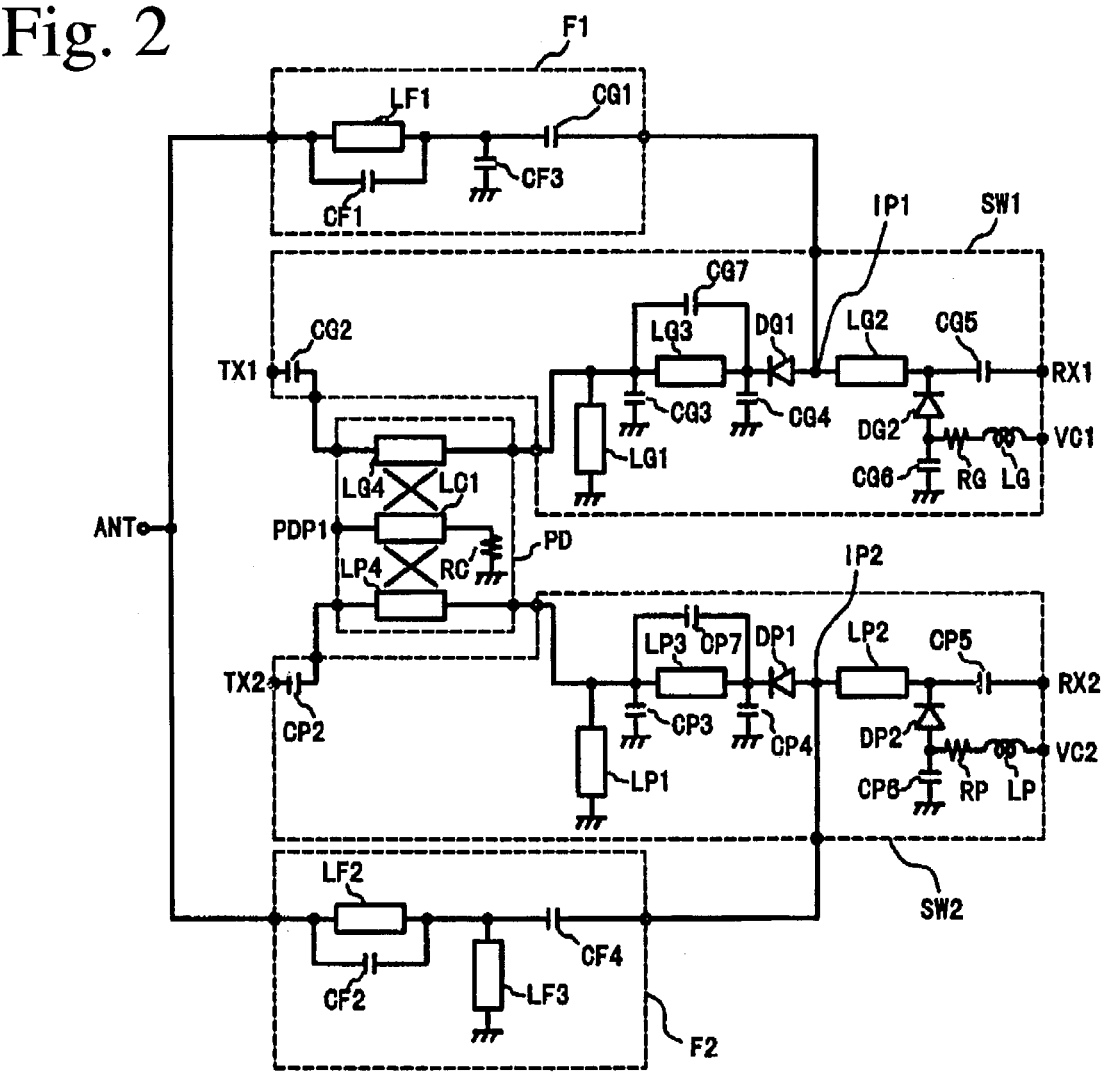
FIG. 2 is a view showing an equivalent circuit of the laminate-type, high-frequency switch module according to one embodiment of the present invention.
Figure 3:
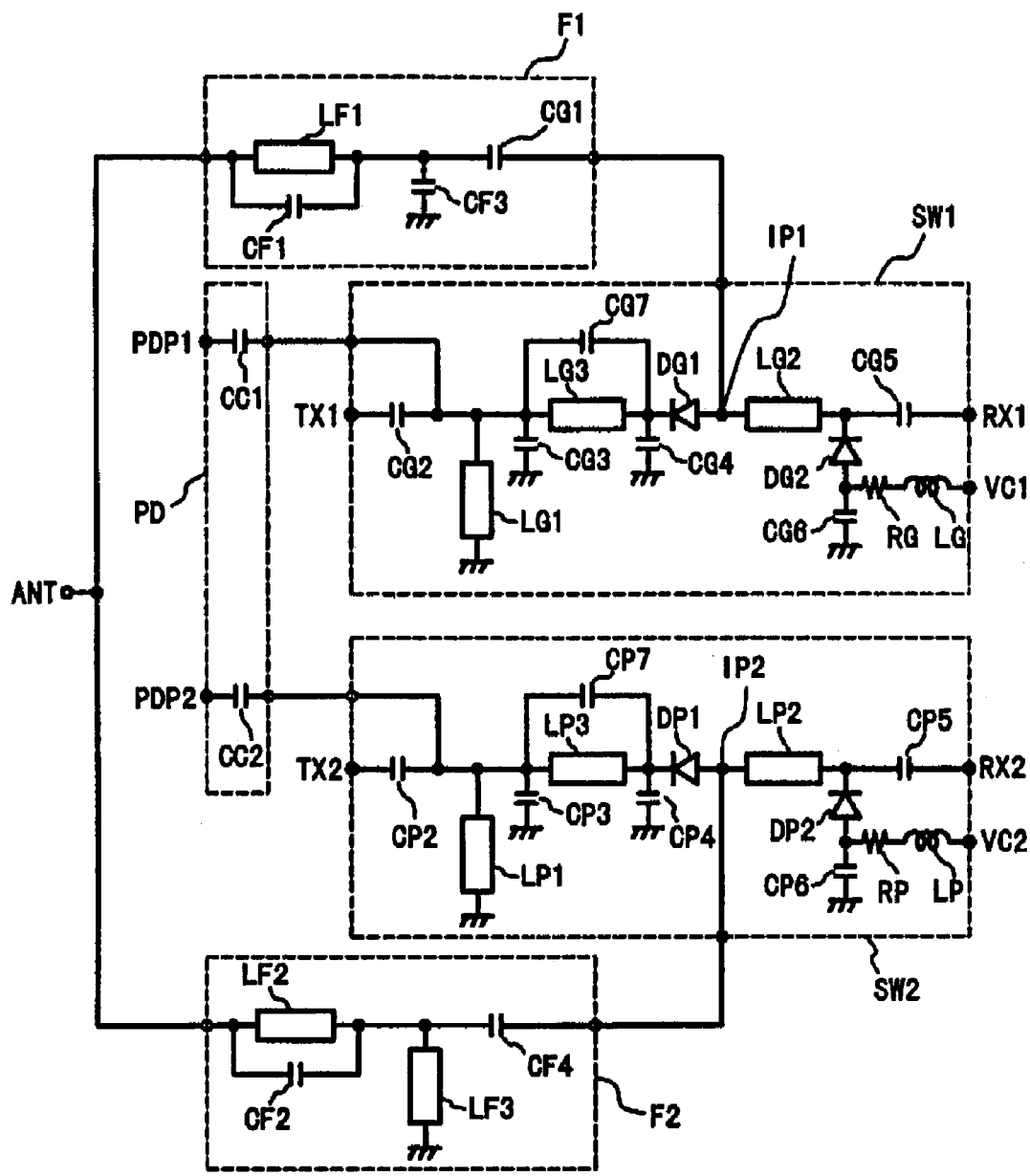
FIG. 3 is a view showing an equivalent circuit of the laminate-type, high-frequency switch module according to another embodiment of the present invention.

The equivalent circuit of the laminate-type, high-frequency switch module of the present invention is explained in detail below referring to FIGS. 2 and 3. FIG. 2 is a view showing an equivalent circuit of the laminate-type, high-frequency switch module comprising a directional coupling circuit as a means for detecting the electric power of transmission signals, and FIG. 3 is a view showing an equivalent circuit of the laminate-type, high-frequency switch module comprising a capacitance-coupling circuit as a means for detecting the electric power of transmission signals.

(1) First and Second Filter Circuits (Branching Circuit)

Each of the first and second filter circuits connected to an antenna ANT is constituted by a distributed constant line and a capacitor. In the equivalent circuit shown in FIG. 2, etc., a first filter circuit F1 for passing transmission and reception signals of GSM while attenuating transmission and reception signals of DCS1800 comprises a low-pass filter, and a second filter circuit F2 for passing transmission and reception signals of DCS1800 while attenuating transmission and reception signals of GSM comprises a high-pass filter. The low-pass filter F1 comprises a distributed constant line LF1, a capacitor CF1 connected in parallel to LF1, and a capacitor CF3 connected between LF1 and CF1 and a ground. The high-pass filter F2 comprises a distributed constant line LF2, a capacitor CF2 connected in parallel to LF2, a distributed constant line LF3 connected between LF2 and CF2 and a ground, and a capacitor CF4 connected in series to the distributed constant line LF2 and the capacitor CF2. With such structure, reception signals of the first transmitting/receiving system and the second transmitting/receiving system can be branched. Distributed constant lines and capacitors constituting the branching circuit are preferably formed by electrode patterns formed on the dielectric layers of the laminate.

Incidentally, the first and the second filter circuits F1, F2 are not restricted to such a structure as described above, but may have the following structures a to h:

a. A structure comprising a low-pass filter as a first filter circuit, and a notch filter as a second filter circuit;

b. A structure comprising a notch filter as a first filter circuit, and a band-pass filter as a second filter circuit;

c. A structure comprising a low-pass filter as a first filter circuit, and a band-pass filter as a second filter circuit;

d. A structure comprising a notch filter as a first filter circuit, and a notch filter as a second filter circuit;

e. A structure comprising a notch filter as a first filter circuit, and a high-pass filter as a second filter circuit;

f. A structure comprising a band-pass filter as a first filter circuit, and a band-pass filter as a second filter circuit F2;

g. A structure comprising a band-pass filter as a first filter circuit, and a notch filter as a second filter circuit; and h. A structure comprising a band-pass filter as a first filter circuit, and a high-pass filter as a second filter circuit.

(2) Switch Circuit

The first switch circuit SW1 disposed downstream of the first filter circuit for switching the transmission circuit TX1 and the reception circuit RX1 of GSM, and the second switch circuit SW2 disposed downstream of the second filter circuit for switching the transmission circuit TX2 and the reception circuit RX2 of DCS1800 comprise diodes and distributed constant lines as main elements.

(a) First Switch Circuit

The first switch circuit SW1 is a switch circuit positioning on an upper side in FIG. 2, for switching the transmission circuit TX1 and the reception circuit RX1 of GSM. The first switch circuit SW1 comprises two diodes DG1, DG2 and two distributed constant lines LG1, LG2 as main elements. The diode DG1 is connected between an input/output terminal IP1, to which an anode of the diode DG1 is connected, and the transmission circuit TX1, and the distributed constant line LG1 is connected between a cathode of the diode DG1 and a ground electrode. The distributed constant line LG2 is connected between the input/output terminal IP1 and the reception circuit RX1, and a cathode of the diode DG2 is connected between one end of the distributed constant line LG2 on the side of the reception circuit RX1 and a ground electrode. Further, the capacitor CG6 is connected between an anode of the diode DG2 and a ground electrode. Connected between the anode of the diode DG2 and the control circuit VC1 is a series circuit comprising an inductor LG and a resister RG.

Each of the distributed constant lines LG1 and LG2 has such a line length that their resonance frequencies are within a frequency band of the transmission signal of GSM. A low-pass filter circuit inserted between the first filter circuit F1 and the transmission circuit TX1 comprises a distributed constant line and a capacitor. In the equivalent circuit shown in FIG. 2, a i-type, low-pass filter constituted by a distributed constant line LG3 and capacitors CG3, CG4 and CG7 is inserted between the diode DG1 and the distributed constant line LG1.

(b) Second Switch Circuit

The second switch circuit is a switch circuit positioned on a lower side in FIG. 2, for switching the reception circuit RX2 and the transmission circuit TX2 of DCS1800. The switch circuit SW2 comprises two diodes DP1, DP2 and two distributed constant lines LP1, LP2 as main elements. The diode DP1 is connected between an input/output terminal IP2 for transmission and reception signals of DCS1800, to which an anode of the diode DP1 is connected, and the transmission circuit TX2. The distributed constant line LP1 is connected between a cathode of the diode DP1 and a ground electrode. A distributed constant line LP2 is connected between the input/output terminal IP2 and the reception circuit RX2, and a cathode of the diode DP2 is connected between one end of the distributed constant line LP2 on the side of the reception circuit RX2 and a ground electrode. A capacitor CP6 is connected between an anode of the diode DP2 and a ground electrode. A series circuit comprising an inductor LP and a resister RP is connected between an anode of the diode DP2 and a control circuit VC2.

Each of the distributed constant lines LP1 and LP2 has such a line length that their resonance frequencies are within a frequency band of the transmission signal of DCS1800. A low-pass filter circuit inserted between the second filter circuit F2 and the transmission circuit TX2 comprises a distributed constant line and capacitors. In the equivalent circuit shown in FIG. 2, a π-type, low-pass filter comprising a distributed constant line LP3 and capacitors CP3, CP4 and CP7 is inserted between the diode DP1 and the distributed constant line LP1.

In any switch circuit, the low-pass filter circuit is compositely incorporated between devices for constituting the switch circuit at any position downstream or upstream of the switch circuit. The distributed constant lines and the capacitors constituting the switch circuits may be formed by electrode patterns on the dielectric layers constituting the laminate.

(3) Directional Coupling Circuit

The directional coupling circuit disposed downstream of the switch circuit comprises a distributed constant line as a main element. A first directional coupling circuit, which takes part of a transmission signal of GSM to detect the electric power of a transmission signal sent from the transmission circuit TX1, comprises a distributed constant line LG4 series-connected between the transmission circuit TX1 and the distributed constant line LG3 as a main line, and a distributed constant line LC1 coupled to the distributed constant line LG4 as a sub-line.

A second directional coupling circuit, which takes part of a transmission signal of DCS1800 to detect the electric power of a transmission signal supplied from the transmission circuit, comprises a distributed constant line LP4 series-connected between the transmission circuit TX2 and the distributed constant line LP3 as a main line, and a distributed constant line LC1 as a sub-line common to the first directional coupling circuit. One end of the distributed constant line LC1 is connected to the ground via a resister RC having substantially the same resistance as the characteristic impedance.

In a dual band mobile phone, high-frequency signals of two systems (for example, GSM and DCS1800) are not transmitted simultaneously. What is necessary in the directional coupler in the laminate-type, high-frequency switch module of the present invention is only that one main line is connected to one sub-line at the time of transmission of either transmission signal, whereby the sub-line may be shared by the two systems. Accordingly, the distributed constant lines LG4, LP4, LC1 for the directional coupler are constituted by electrode patterns in the laminate formed by laminating dielectric sheets having the electrode patterns, the distributed constant line LC1 being partially opposing the distributed constant lines LG4, LP4 via a dielectric layer in a lamination direction. Alternatively, the distributed constant line LC1 may be opposing the distributed constant lines LG4, LP4 on the same layer.

With the directional coupler thus constituted, the connection of a main line and a sub-line causes part of the transmission signal sent from the high-frequency amplifier PA1 or PA2 to the main line to enter into the sub-line and exit from the coupling terminal PDP1.

Figure 4:
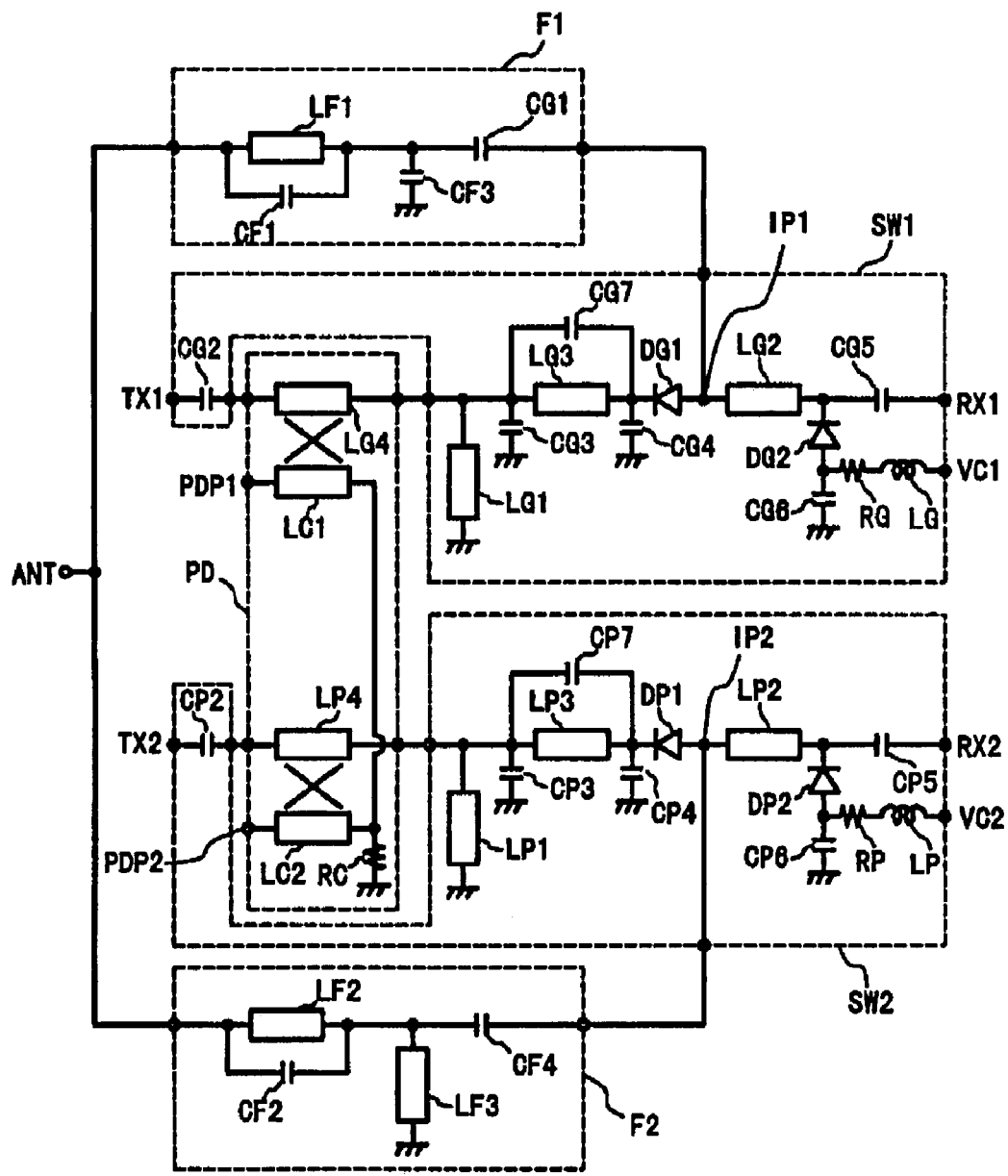
FIG. 4 is a view showing an equivalent circuit of the laminate-type, high-frequency switch module according to a further embodiment of the present invention.
Figure 5:
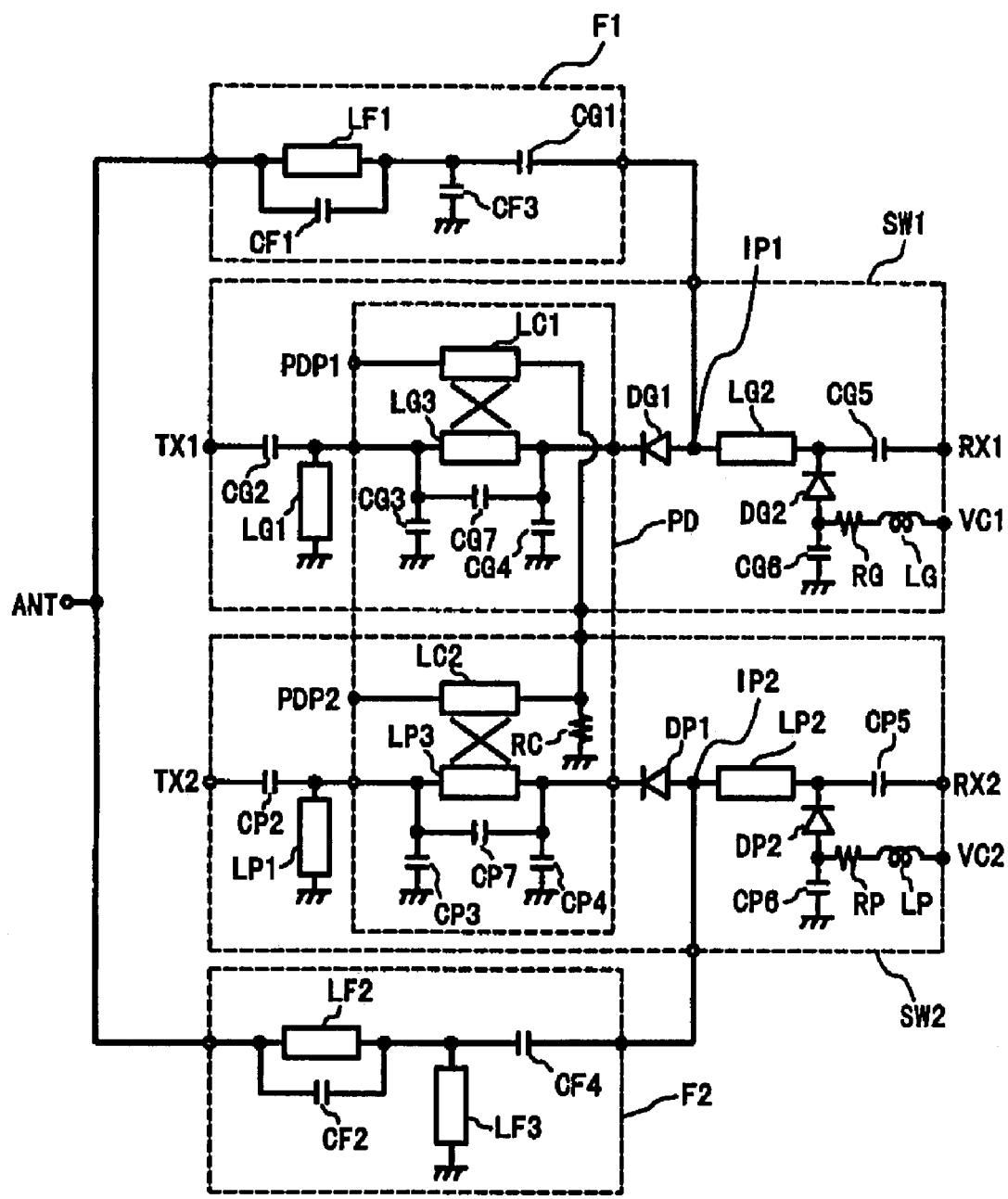
FIG. 5 is a view showing an equivalent circuit of the laminate-type, high-frequency switch module according to a still further embodiment of the present invention.
Figure 6:
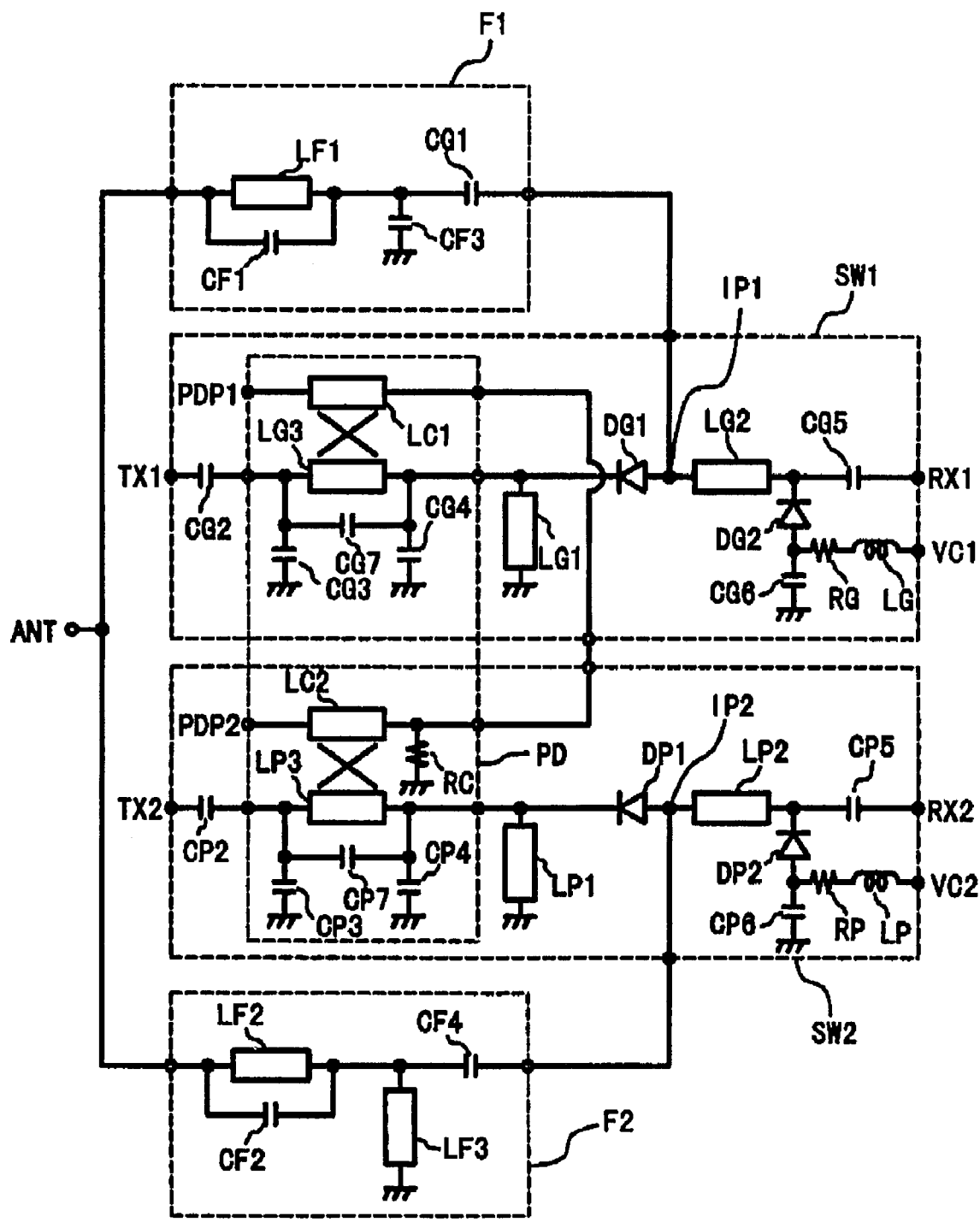
FIG. 6 is a view showing an equivalent circuit of the laminate-type, high-frequency switch module according to a still further embodiment of the present invention.

Though explanation has been made above on a case where the sub-line is shared by two systems, each system may have a separate directional coupler comprising a distributed constant line as a sub-line, which is coupled to a distributed constant line as a main line, with ends of the distributed constant lines LC1, LC2 being terminated by a resister RC, as in the equivalent circuit shown in FIG. 4. Alternatively, as in the equivalent circuits shown in FIGS. 5 and 6, a directional coupling circuit may be constituted by a distributed constant line for a low-pass filter circuit as a main line, and a sub-line coupled thereto.

The length of a line of the directional coupling circuit including the main line, which is connected to the high-frequency amplifier, is preferably set, such that the impedance of the directional coupling viewed form the side of the high-frequency amplifiers is regarded substantially as an open state at the time of reception at the connecting point of the high-frequency amplifiers PA1, PA2 and the directional coupling circuit, because the isolation of the antenna ANT from the transmission terminal TX at the time of reception is improved. For example, to an intermediate frequency X of each of a transmission signal (880-915 MHz) of GSM and a transmission signal (1710-1785 MHz) of DCS1800, the length of a line of the directional coupling circuit including the main line, which is connected to the high-frequency amplifier, is preferably $(\lambda/6-\pi/3)+n\times\lambda/2$, wherein n is an integer.

The term "substantially in an open state" used herein means a case where the real part R is adjusted to 150 Ω or less, and a case where an absolute value of the imaginary part X is adjusted to 100 Q or more, in the impedance Z expressed by Z=R+jX in a Smith chart.

(4) Amplifier Circuit

Figure 22:
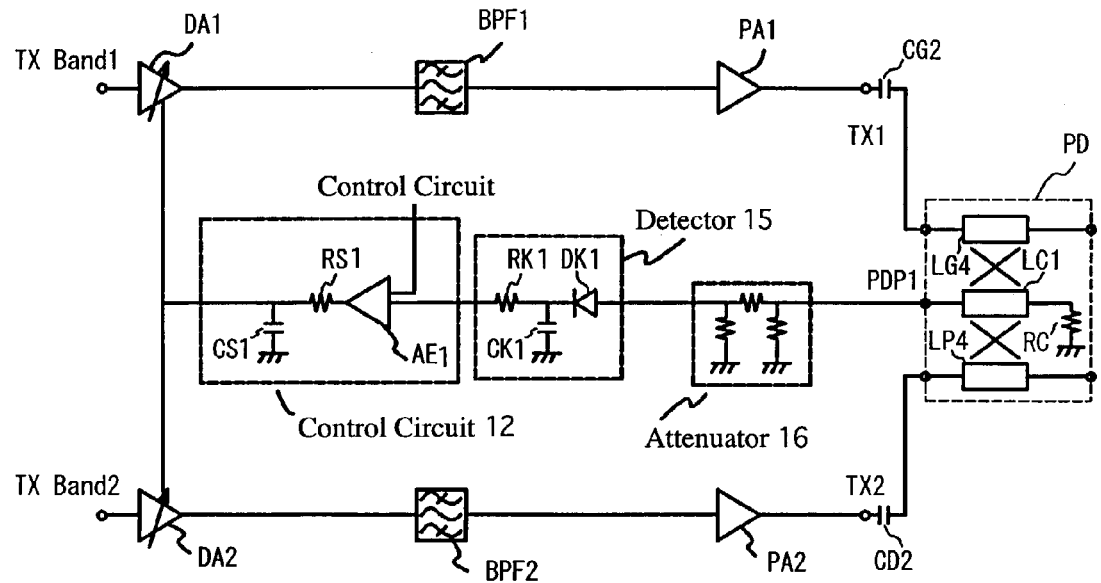
FIG. 22 is a view showing an equivalent circuit of one example of an amplifier circuit in the laminate-type, high-frequency switch module of the present invention.

FIG. 22 is a block diagram showing an amplifier circuit connected to or made integral with the laminate-type, high-frequency switch module. With this variable gain amplifier circuit, part of the transmission signal supplied from the coupling terminal PDP1 is attenuated by an attenuator 16 (used if necessary) comprising resisters to such a power level that it can be treated by downstream circuits, and supplied to a detector 15 via an impedance matching device (not shown). After it is rectified by a detecting diode DK1 in the detector 15, it is turned to a detection signal with voltage varied by a smoothing capacitor CK1 and a load resister RK1, and supplied to a control circuit 12. The detection signal is input to one error amplifier EA1, and compared with a control signal of the predetermined transmission signal level. It is fed back to the variable gain amplifier DA1 or DA2 such that their difference is minimized. The gain is thus varied so that the transmission signal is controlled to a targeted transmission output level. The detector 15 and the control circuit 12 constitute an automatic gain control circuit (APC).

Contrary to the conventional amplifier circuit, the detector 15, the control circuit 12, etc. are shared by a plurality of systems, so that the number of parts constituting the variable gain amplifier circuit is reduced, and that the circuit is miniaturized. As a result, the overall size of the composite, laminate-type, high-frequency switch module can be reduced.

Because transistors and MMICs (microwave monolithic integrated circuits) constituting the high-frequency amplifiers PA1, PA2 have large power consumption and heat generation, the detector 15 may be provided with a temperature-sensing element (thermistor) for compensating temperature variations to control the temperature characteristics of the detector 15.

Figure 23:
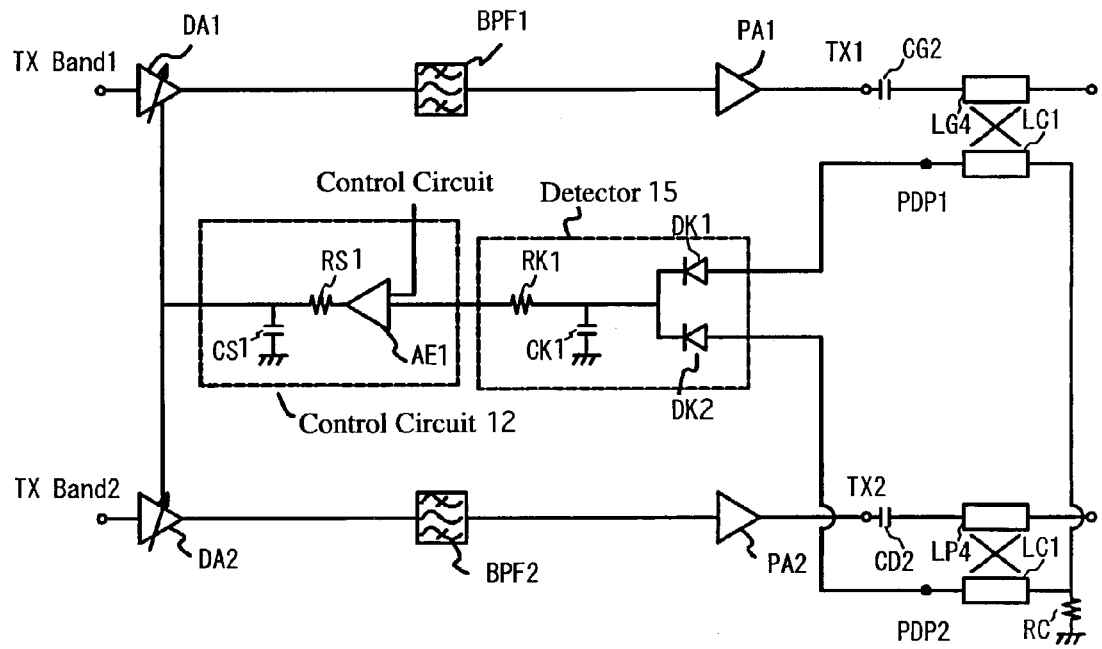
FIG. 23 is a view showing an equivalent circuit of a still further example of the amplifier circuit used in the laminate-type, high-frequency switch module.

FIG. 23 is a block diagram showing an amplifier circuit connected to or made integral with the laminate-type, high-frequency switch module, which comprises two coupling terminals as shown in FIG. 4. The differences of this amplifier circuit from the above amplifier circuit are that because of two coupling terminals (PDP1, PDP2), electric powers taken out of the coupling terminals PDP1, PDP2 are input to two detecting diodes DK1, DK2 to be rectified, turned to detection signals with voltage varied by a smoothing capacitor CK1 and a load resister RK1, and input to a common error amplifier EA1. In this case, too, the number of parts constituting the amplifier circuit can be made smaller than in the conventional one, resulting in a smaller circuit.

Figure 24:
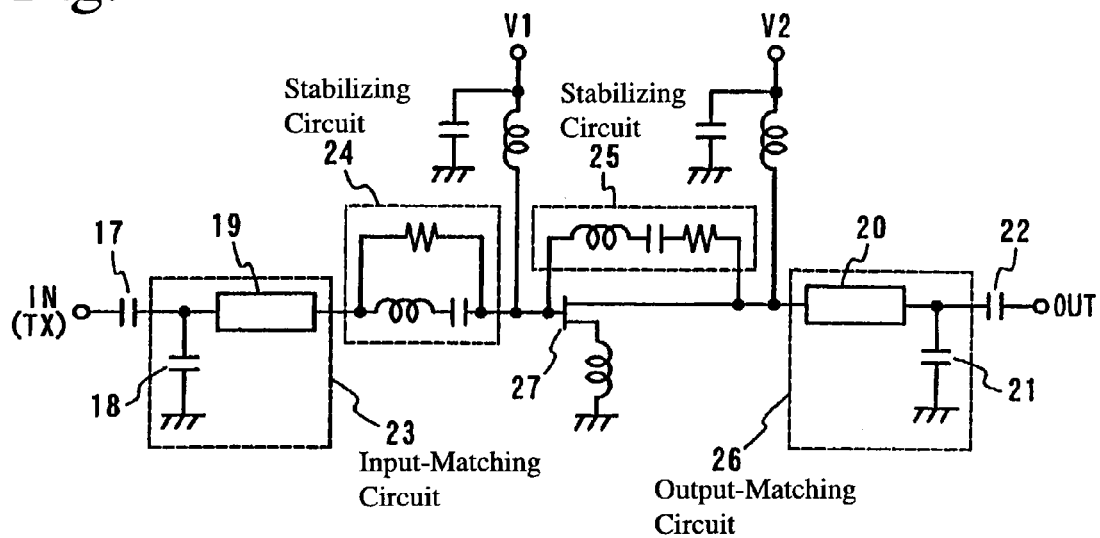
FIG. 24 is a view showing an equivalent circuit of one example of a high-frequency amplifier used in the laminate-type, high-frequency switch module.
Figure 25:
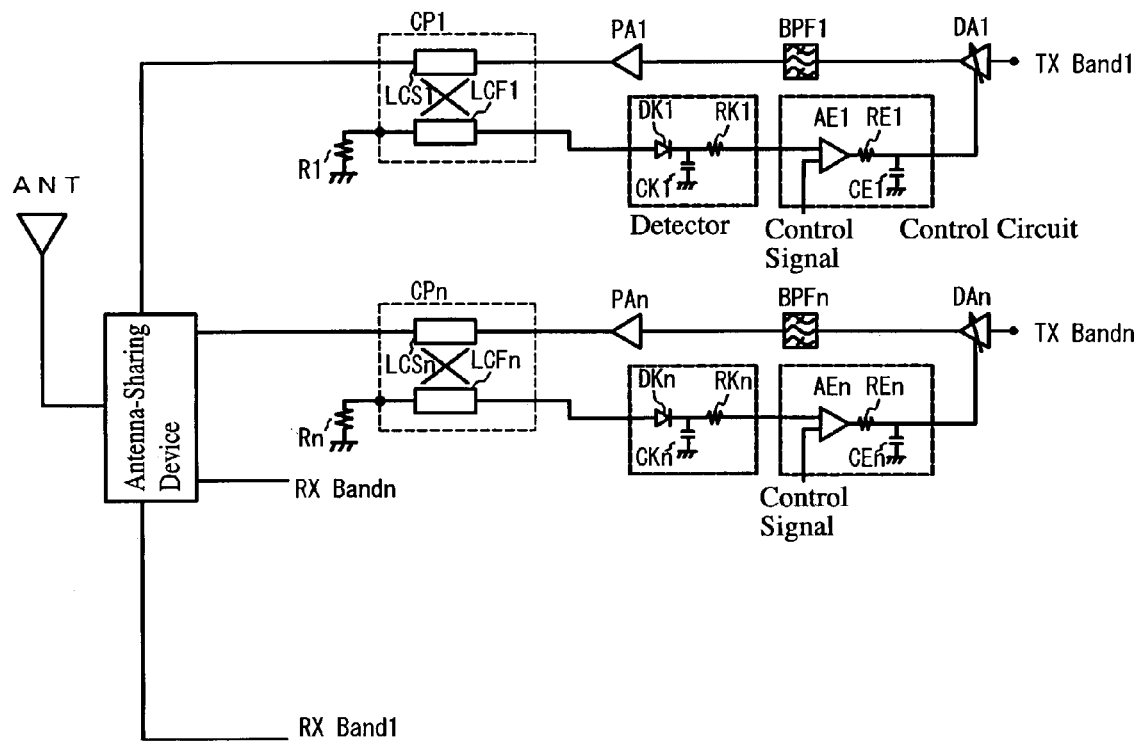
FIG. 25 is a block diagram showing the essential structure of a transmission part in a multiband mobile phone.

FIG. 24 shows one example of the equivalent circuit of a high-frequency amplifier used in the amplifier circuit, comprising an input-matching circuit 23 having an inductor 19 and a capacitor 18, and output-matching circuit 26 having an inductor 20 and a capacitor 21, oscillation-preventing, stabilizing circuits 24, 25 each comprising a resister, a capacitor and an inductor, and a field effect transistor 27.

The overall size of the laminate-type, high-frequency switch module can be made smaller, by mounting the field effect transistor 27 constituting the high-frequency amplifier onto the laminate surface, by forming inductors constituting the input-matching circuit 23 and the output-matching circuit 26 by distributed constant lines, which are formed by electrode patterns formed on the dielectric layers of the laminate, by forming capacitors by capacitor electrodes opposing via a dielectric layer in the laminate, and by mounting the detecting diode DK1, etc. constituting the APC circuit on the laminate surface.

(5) Capacitance-Coupling Circuit

Explanation will be made on a case where a capacitance-coupling circuit is used, as another method for detecting the electric power of a transmission signal sent from the transmission circuit.

FIG. 3 is a view showing an equivalent circuit of the laminate-type, high-frequency switch module comprising a capacitance-coupling circuit as a method for detecting the electric power of transmission signals. The capacitance-coupling circuit disposed downstream of the switch circuits comprises a capacitor as a main element. A first capacitance-coupling circuit is constituted by a capacitor CC1 connected in parallel with a capacitor CG2 between the capacitor CG2 and the distributed constant line LG3 for getting part of a transmission signal from the transmission circuit TX1 of GSM, to detect the electric power of the transmission signal sent from the transmission circuit TX1.

The second capacitance-coupling circuit is constituted by a capacitor CC2 connected in parallel with the capacitor CP2 between the capacitor CP2 and the distributed constant line LP3 for getting part of a transmission signal from the transmission circuit TX2 of DCS1800, to detect the electric power of the transmission signal sent from the transmission circuit.

The capacitors CC1, CC2 are constituted by electrode patterns formed on the dielectric layers of the laminate, and the electrode patterns are coupled by electrostatic capacitance via a dielectric layer in a lamination direction to constitute a capacitance-coupling circuit. The capacitance-coupling degree can be controlled by various factors such as the area and distance of the opposing electrode patterns of the capacitor constituting the capacitance-coupling circuit, the dielectric constant of a dielectric layer therebetween, etc. Alternatively, the electrode patterns may be coupled by opposing in parallel in the same layer, to constitute the capacitors CC1, CC2. In this case, various degrees of coupling can be obtained by adjusting the edge length of the opposing electrode patterns.

[2] Operation

The laminate-type, high-frequency switch module of the present invention controls the on/off of the diode switches by applying voltage from a power supply means (control circuit) to select one of the first and second transmitting/receiving systems. Explanation will be made below on the operation of the laminate-type, high-frequency switch module having the block circuit shown in FIG. 1 and the equivalent circuit shown in FIG. 2.

(1) GSM TX Mode

To connect the first transmission circuit TX1 to the first filter circuit F1, positive voltage is applied from the control circuit VC1. The positive voltage is deprived of a DC component by the capacitors CG6, CG5, CG4, CG7, CG3, CG2 and CG1, and applied to a circuit comprising the diodes DG2 and DG1. As a result, the diodes DG2 and DG1 are turned on. With the diode DG1 in an ON state, there is low impedance between the first transmission circuit TX1 and the connecting point IP1. The distributed constant line LG2 is grounded at a high frequency by the diode DG2 in an ON state and the capacitor CG6, resulting in resonance. Thus, impedance is extremely large when the first reception circuit RX1 is viewed from the connecting point IP1. As a result, the transmission signal from the first transmission circuit TX1 is transmitted to the first filter circuit F1 without leaking to the reception circuit RX1.

Part of the electric power of the transmission signal from the first transmission circuit TX1 appears at the coupling terminal PDP1, and is then sent to the automatic gain control circuit (APC). Part of the high-frequency electric power oppositely flowing from the antenna side is absorbed by a resister RC.

(2) GSM RX Mode

To connect the first reception circuit RX1 to the first filter circuit F1, zero voltage is applied from the control circuit VC1 to turn off the diodes DG1 and DG2. With the diode DG2 in an OFF state, the connecting point IP1 is connected to the first reception circuit RX1 via the distributed constant line LG2. Also, with the diode DG1 in an OFF state, there is large impedance between the connecting point IP1 and the first transmission circuit TX1. As a result, the reception signal from the first filter circuit F1 is transmitted to the first reception circuit RX1 without leaking to the first transmission circuit TX1.

(3) DCS TX Mode

To connect the second transmission circuit TX2 to the second filter circuit F2, positive voltage is applied from the control circuit VC2. The positive voltage applied from the control circuit VC2 is deprived of a DC component by capacitors CP6, CP5, CP4, CP7, CP3, CP2 and CF4 and applied to a circuit including diodes DP1 and DP2, resulting in turning on the diodes DP1, DP2. When the diode DPI is turned on, impedance becomes low between the second transmission circuit TX2 and the connecting point IP2. The distributed constant line LP2 is grounded at a high frequency by the turned-on diode DP2 and the capacitor CP6, resulting in resonance. This leads to extremely large impedance when the second reception circuit RX2 is viewed from the connecting point IP2. As a result, the transmission signal from the second transmission circuit TX2 is transmitted to the second filter circuit F2, without leaking to the second reception circuit RX2.

Part of the electric power of the transmission signal from the second transmission circuit TX2 appears at the coupling terminal PDP2, and is then sent to the automatic gain control circuit (APC). Part of the high-frequency electric power oppositely flowing from the antenna side is absorbed by the resister RC.

(4) DCS RX Mode

To connect the second reception circuit RX2 to the second filter circuit F2, no voltage is applied from the control circuits VC2, leaving the diodes DP1 and DP2 in an OFF state. With the diode DP2 in an OFF state, the connecting point IP2 is connected to the second reception circuit RX2 via the distributed constant line LP2. Further, with the diode DPI in an OFF state, there is large impedance between the connecting point IP2 and the second transmission circuit TX2. As a result, the reception signal from the second filter circuit F2 is transmitted to the second reception circuit RX2, without leaking to the second transmission circuit TX2.

[3] Embodiments (1) First Embodiment

Figure 7:
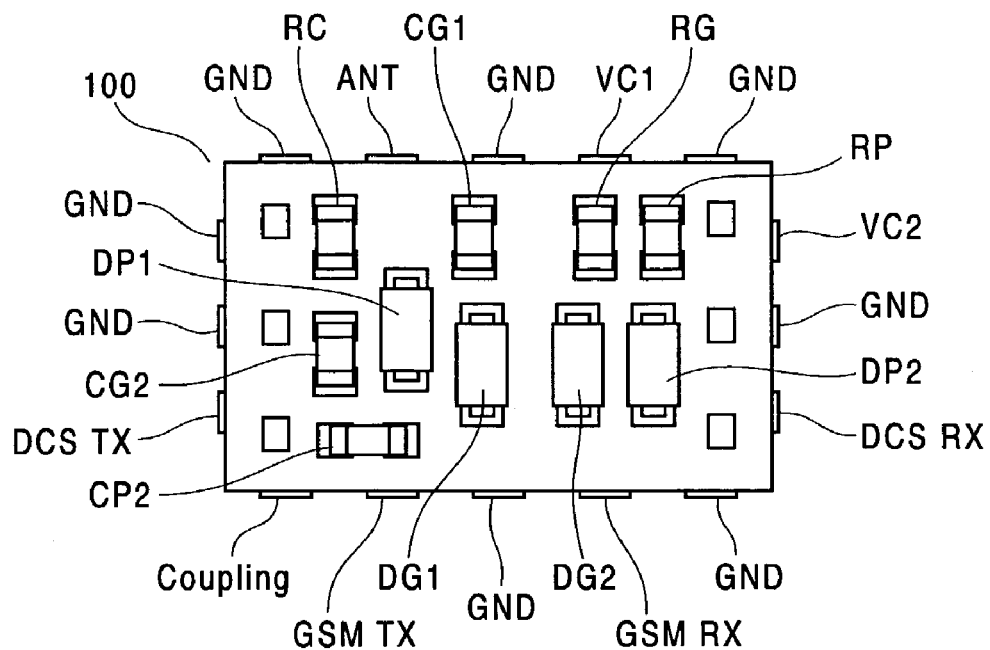
FIG. 7 is a plan view showing the laminate-type, high-frequency switch module of the present invention.
Figure 8:
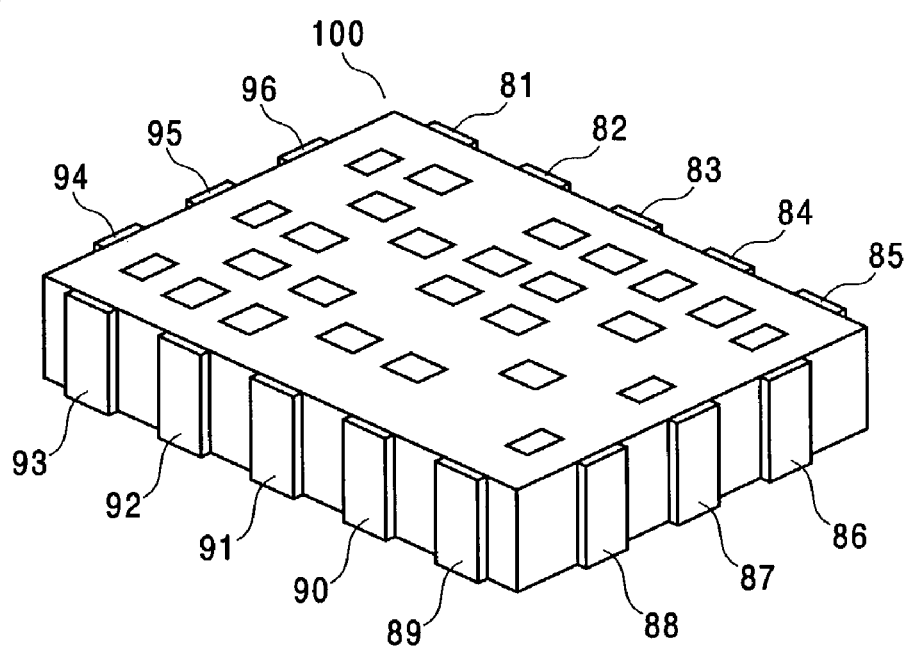
FIG. 8 is a perspective view showing the laminate-type, high-frequency switch module of the present invention.
Figure 9:
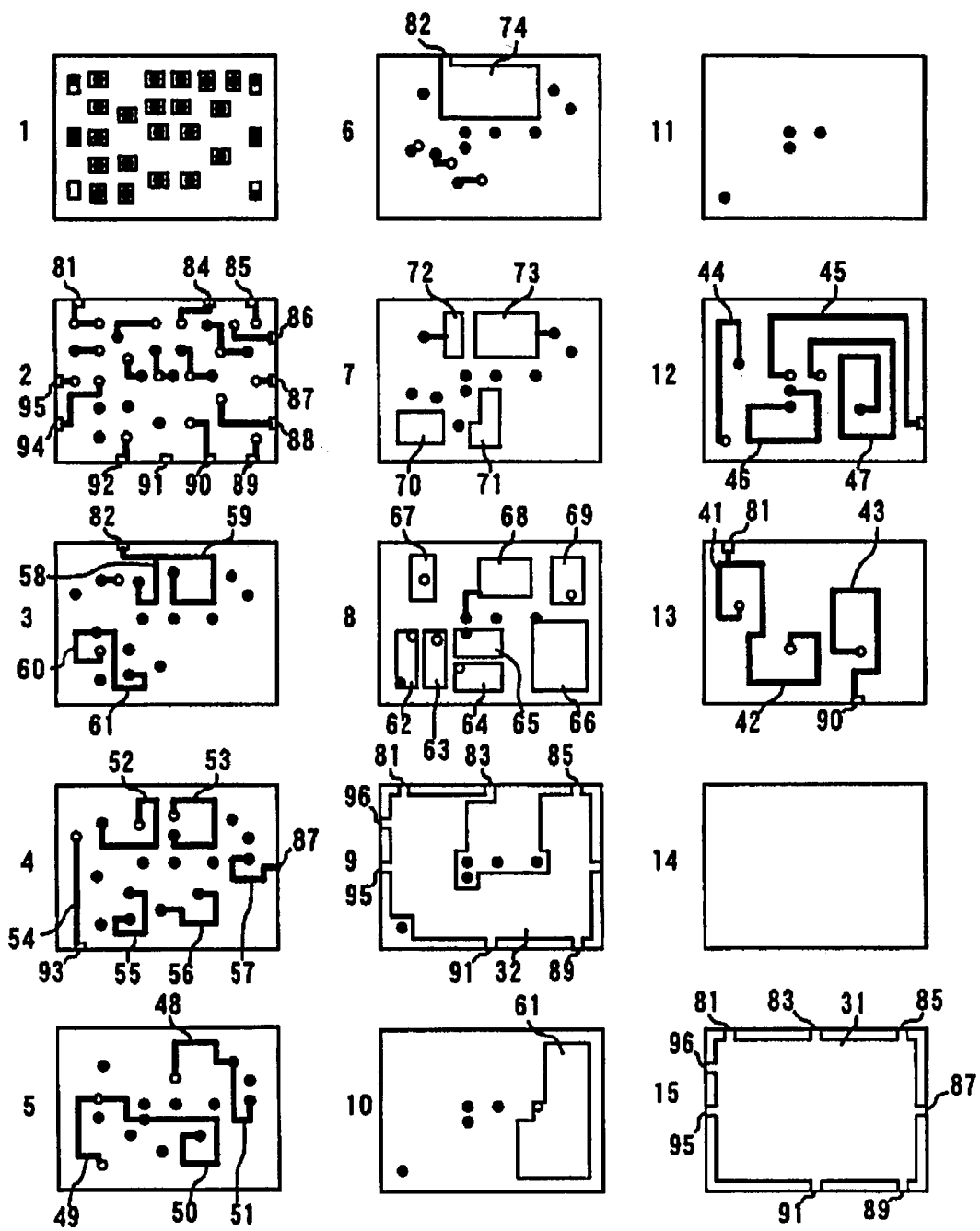
FIG. 9 is an exploded view showing a plurality of dielectric layers constituting the laminate for the laminate-type, high-frequency switch module of the present invention.
Figure 10:
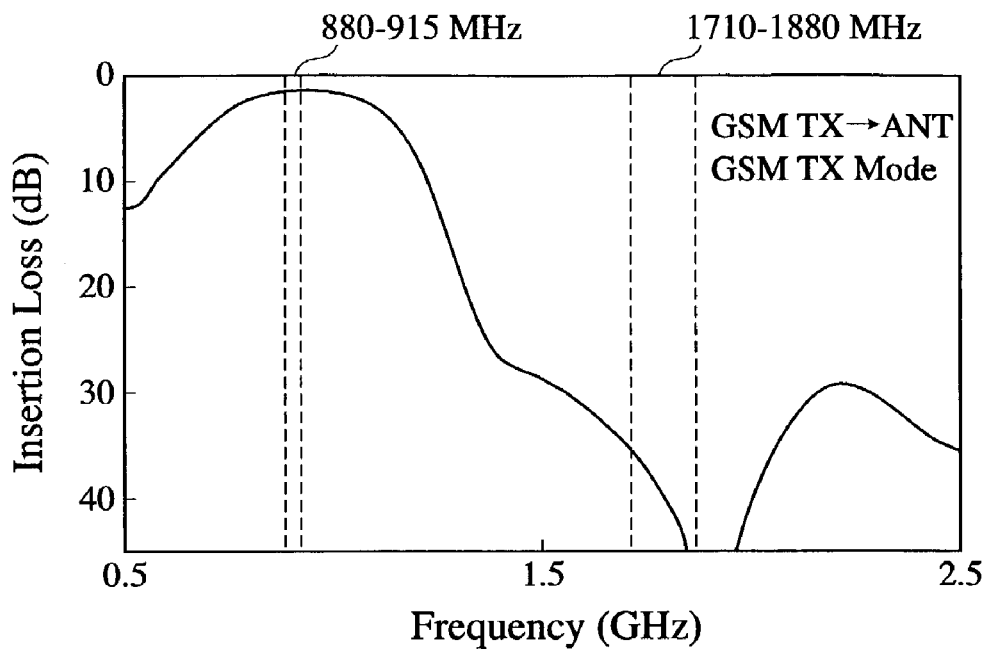
FIG. 10 is a graph showing one example of the insertion loss between TX1 and ANT in the laminate-type, high-frequency switch module according to one embodiment of the present invention.
Figure 11:
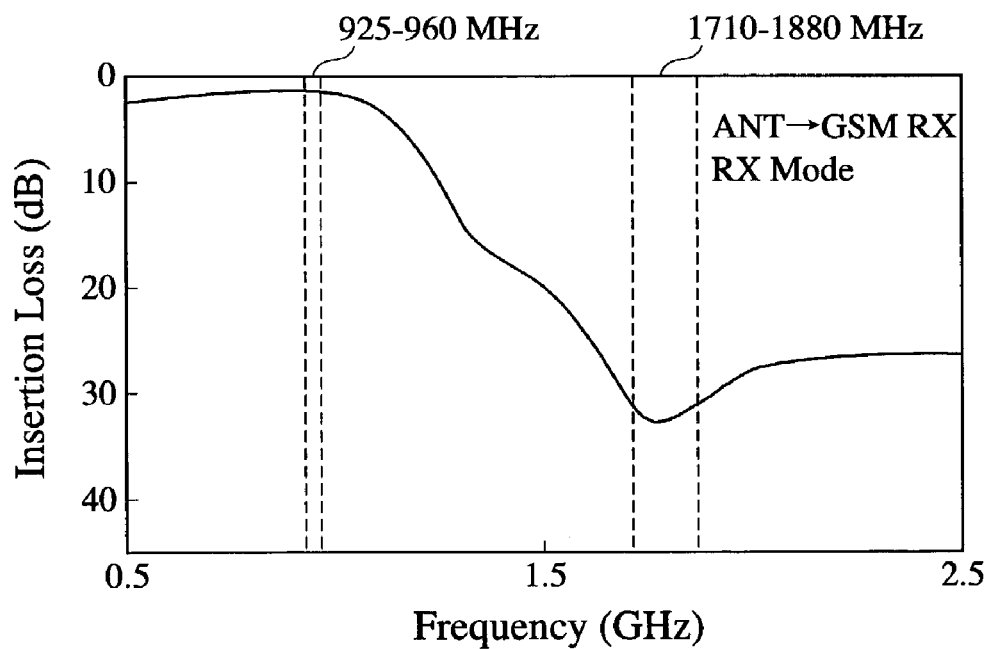
FIG. 11 is a graph showing one example of the insertion loss between ANT and RX1 in the laminate-type, high-frequency switch module according to one embodiment of the present invention.
Figure 12:
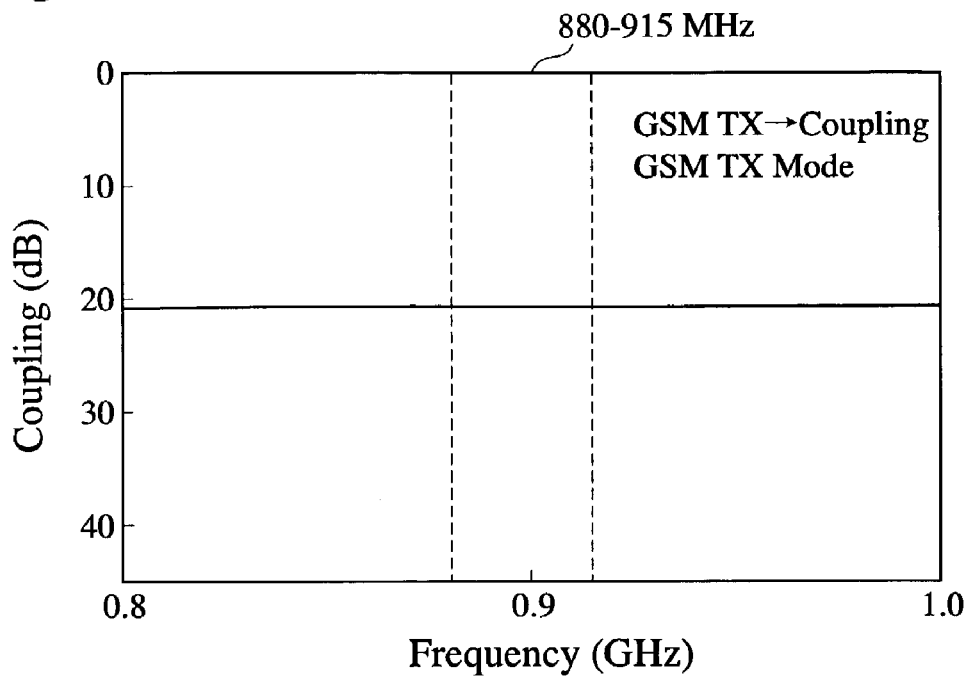
FIG. 12 is a graph showing one example of the coupling between TX1 and PDP1 in the laminate-type, high-frequency switch module according to one embodiment of the present invention.
Figure 13:
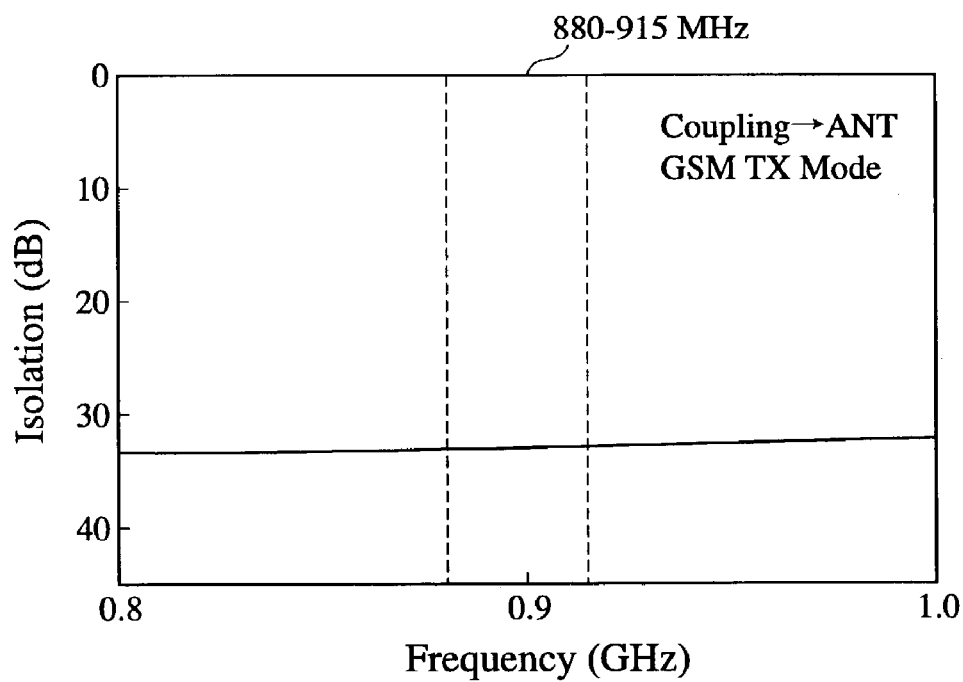
FIG. 13 is a graph showing one example of the isolation between TX1 and RC in the laminate-type, high-frequency switch module according to one embodiment of the present invention.
Figure 14:
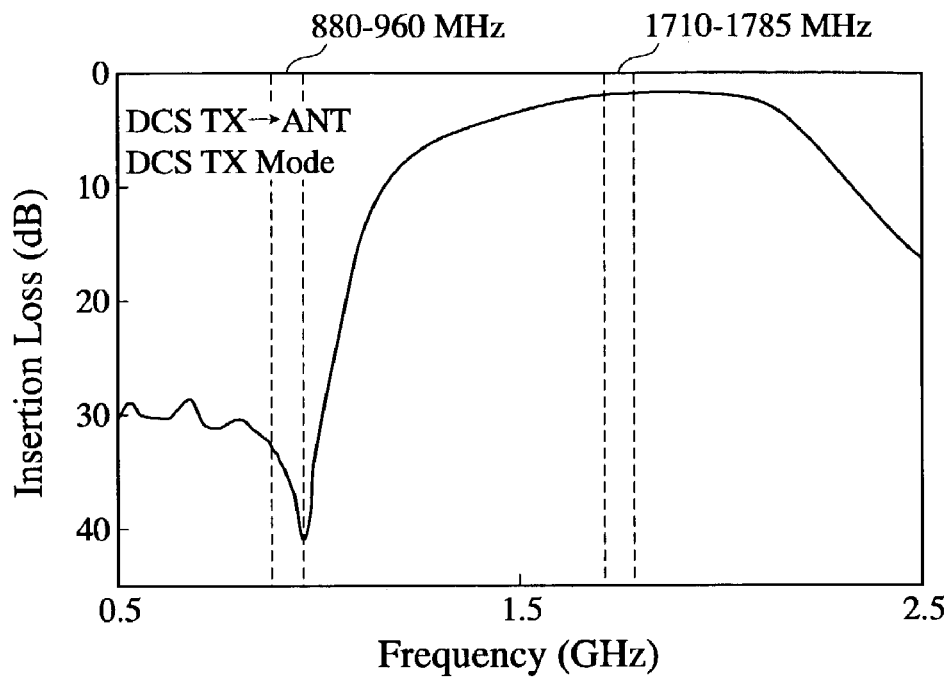
FIG. 14 is a graph showing one example of the insertion loss between TX2 and ANT in the laminate-type, high-frequency switch module according to one embodiment of the present invention.
Figure 15:
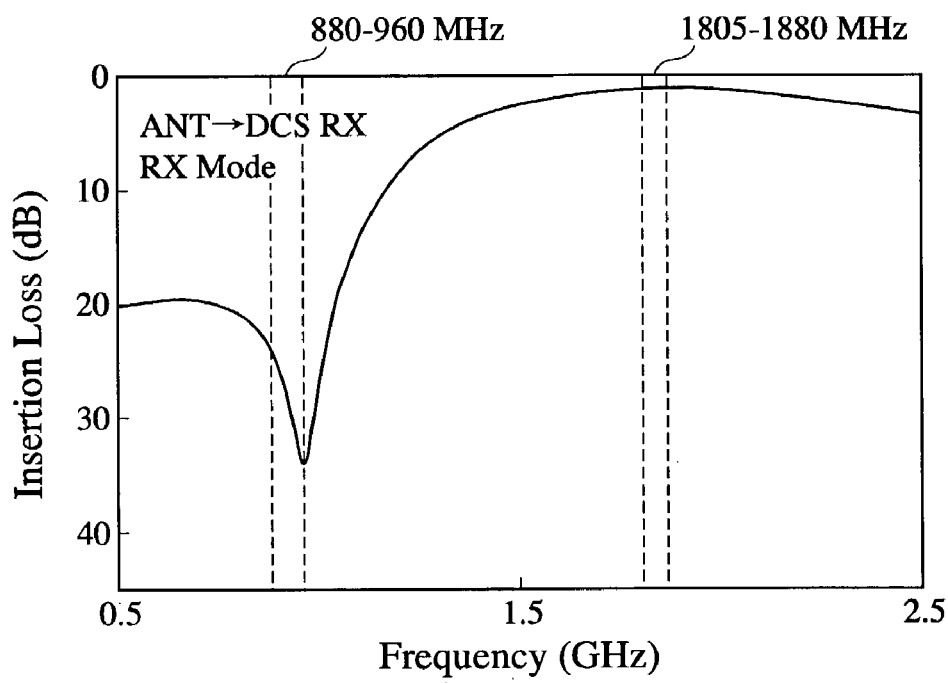
FIG. 15 is a graph showing one example of the insertion loss between ANT and RX2 in the laminate-type, high-frequency switch module according to one embodiment of the present invention.
Figure 16:
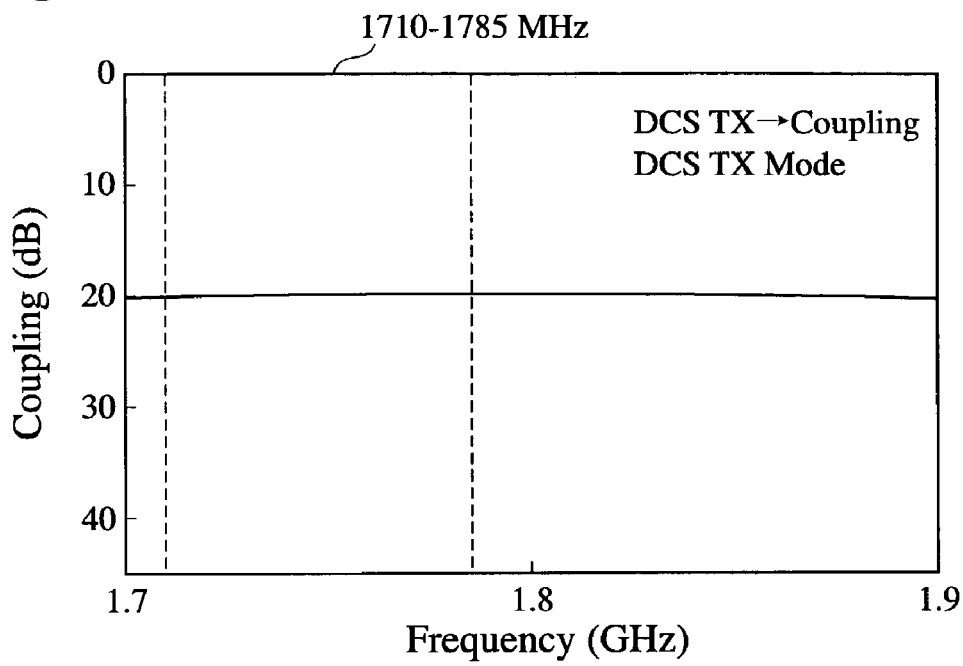
FIG. 16 is a graph showing one example of the coupling between TX2 and PDP1 in the laminate-type, high-frequency switch module according to one embodiment of the present invention.
Figure 17:
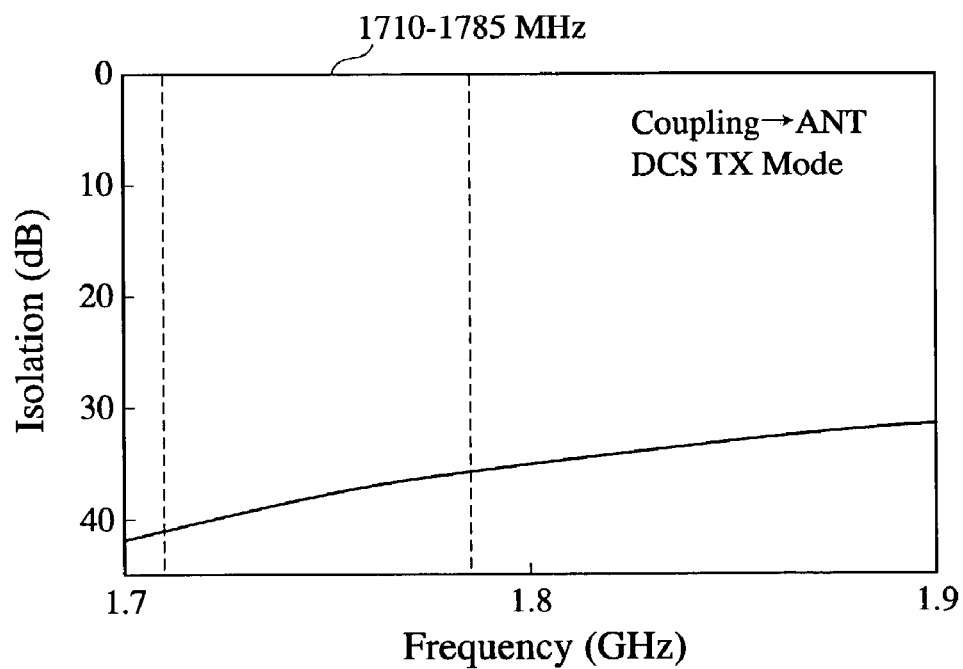
FIG. 17 is a graph showing one example of the isolation between TX2 and RC in the laminate-type, high-frequency switch module according to one embodiment of the present invention.

FIG. 7 is a plan view showing the laminate-type, high-frequency switch module according to one embodiment of the present invention, FIG. 8 is a perspective view showing a laminate portion thereof, and FIG. 9 is an exploded view showing the inner structure thereof. In this embodiment, distributed constant lines for the first and second filter circuits, the low-pass filter circuit and the switch circuits, and distributed constant lines for the directional coupling circuits are formed in the laminate, while diodes and high-capacitance capacitors as chip capacitors, which cannot be formed in the laminate, are mounted onto the laminate surface, resulting in a one-chip, laminate-type, high-frequency switch module.

This laminate can be produced by preparing green sheets of 20–200 μm in thickness from low-temperature-sinterable dielectric ceramics; printing an electrically conductive, Ag-based paste onto each green sheet to form a desired electrode pattern; integrally laminating green sheets having desired electrode patterns; and sintering the resultant laminate. Line electrodes are as wide as about 100–400 μm.

Referring to FIG. 9, the internal structure of the laminate will be explained in the order of lamination. First, a green sheet 15 for the lowermost layer is coated with a ground electrode 31 substantially on its entire surface and provided with connecting portions for connection to terminal electrodes 81, 83, 85, 87, 89, 91, 95 and 96 on side surfaces.

After laminating a dummy green sheet 14 with no printed electrode pattern on the green sheet 15, a green sheet 13 provided with three line electrodes 41, 42, 43, a green sheet 12 provided with four line electrodes 44, 45, 46 and 47 are laminated thereon in this order. Laminated thereon are a green sheet 11 provided with four through-hole electrodes (marked with black circle in the figure), and a green sheet 10 provided with four through-hole electrodes and a capacitor electrode 61, and a green sheet 9 provided with a ground electrode 32.

Proper connection of line electrodes in regions sandwiched by the two ground electrodes 31, 32 forms distributed constant lines for the first and second switch circuits SW1, SW2. The line electrodes 42 and 46 connected via through-hole electrodes constitute a distributed constant line LG1 in the equivalent circuit, the line electrodes 43 and 47 connected via through-hole electrodes constitute a distributed constant line LG2 in the equivalent circuit, the line electrodes 41 and 44 connected via through-hole electrodes constitute a distributed constant line LP1 in the equivalent circuit, and the line electrode 45 constitutes a distributed constant line LP2 in the equivalent circuit.

Formed on a green sheet 8 laminated on the green sheet 9 are electrodes 62, 63, 64, 65, 66, 67, 68 and 69 for capacitors. A green sheet 7 laminated thereon is also provided with electrodes 70, 71, 72 and 73 for capacitors. A green sheet 6 laminated thereon is provided with a capacitor electrode 74.

Laminated thereon are a green sheet 5 provided with line electrodes 48, 49, 50 and 51, and a green sheet 4 provided with line electrodes 52, 53, 54, 55, 56 and 57 in this order. Laminated thereon are a green sheet 3 provided with line electrodes 58, 59 and 60, and a green sheet 2 provided with connecting line electrodes in this order. An uppermost green sheet 1 is provided with lands for mounting elements.

Each of capacitor electrodes 62, 63, 64, 65, 66, 67, 68 and 69 on the green sheet 8 laminated on the green sheet 9 constitutes capacitance with a ground electrode 32 formed on the upper side of the green sheet 9, and the ground electrode 32 on the green sheet 9 laminated on the green sheet 10 constitutes capacitance with a capacitor electrode 61 on the green sheet 10. Specifically, the capacitor electrode 62 constitutes a capacitor CP3, the capacitor electrode 63 constitutes a capacitor CP4, the capacitor electrode 65 constitutes a capacitor CG4, the capacitor electrode 64 constitutes a capacitor CG3, the capacitor electrode 67 constitutes a capacitor CF3, the capacitor electrode 69 constitutes a capacitor CP6, and the capacitor electrodes 61 and 66 constitute a capacitor CG6.

Electrodes for capacitors formed on the green sheets 6, 7 and 8 constitute capacitance with each other. The capacitor electrodes 68 and 73 constitute a capacitor CF4, the capacitor electrodes 62, 63 and 70 constitute a capacitor CP7, the capacitor electrodes 72 and 74 constitute a capacitor CF1, the capacitor electrodes 73 and 74 constitute a capacitor CF2, and the capacitor electrodes 64, 65 and 71 constitute a capacitor CG7. The capacitor electrode 73 and the capacitor electrode 68 opposing each other constitute capacitance, though a ground electrode 32 is provided with notches such that these electrodes do not oppose the ground electrode 32. Through-hole electrodes for connecting the distributed constant lines are positioned in the notches. Alternatively, these notches may be used to form through-hole electrodes connected to the distributed constant lines.

In the green sheets 3, 4 and 5, the line electrodes 52, 58 constitute a distributed constant line LF1; the line electrodes 48, 53, 59 constitute a distributed constant line LF2; the line electrodes 51, 57 constitute a distributed constant line LF3; the line electrodes 50, 56 constitute a distributed constant line LG3; the line electrodes 55, 61 constitute a distributed constant line LP3; the line electrode 60 constitutes a distributed constant line LP4; and the line electrode 49 constitutes a distributed constant line LG4. The line electrodes on the green sheet 2 also function as lines for wiring.

In the green sheet 4, the line electrode 54 constituting the distributed constant line LC1 is partially opposing the line electrode 60 formed on the green sheet 3 and the line electrode 49 formed on the green sheet 5 in a lamination direction, thereby constituting a directional coupler in their opposing portions. One end of the line electrode 54 is led to the outer surface of the laminate via a through-hole, where it is connected to a chip resister RC having substantially the same resistance as the characteristic impedance.

Laminated green sheets are integrally pressure-bonded and sintered to provide, for instance, a laminate 100 of 6.7 mm×5.0 mm×1.0 mm in outer size. The resultant laminate 100 is provided with terminal electrodes 81, 82, 83, 84, 85, 86, 87, 88, 89, 90, 91, 92, 93, 94, 95, 96 on side surfaces. The appearance of the resultant laminate 100 is shown in FIG. 8.

Mounted onto this laminate 100 are diodes DG1, DG2, DP1 and DP2, chip capacitors CG1, CG2 and CP2, and chip resisters RG, RP and RC. FIG. 7 is a plan view showing the laminate provided with these elements. FIG. 7 also shows a mounting structure (connection structure of each terminal) of this laminate-type, high-frequency switch module. In FIG. 7, GND means a terminal connected to a ground.

In this embodiment, the distributed constant lines CG5, CP5, LG and LP in the equivalent circuit shown in FIG. 2 are formed on a circuit for mounting chip parts.

In this embodiment, because the distributed constant lines of the first and second switch circuits are formed in regions sandwiched by ground electrodes in the laminate, interference is prevented between the switch circuits, and the branching filter circuit and the low-pass filter circuit. When regions sandwiched by the ground electrodes are disposed in a lower part of the laminate, a ground voltage can easily be obtained. Electrodes constituting a capacitor with a ground electrode are formed in opposite to a ground electrode above it.

The laminate in this embodiment is provided with terminals on side surfaces, whereby surface mounting can be achieved. Terminals mounted onto the side surfaces of the laminate are an ANT terminal, a TX2 terminal for DCS1800, a TX1 terminal for GSM, an RX1 terminal for GSM, an RX2 terminal for DCS1800, a coupling terminal, a ground terminal GRD, and control terminals VC1, VC2. In addition, each side surface of this laminate is provided with at least one ground terminal.

Among the terminal electrodes formed on the side surfaces of the laminate 100 in this embodiment, a TX2 terminal for DCS, a TX1 terminal for GSM, an RX1 terminal for GSM, and an RX2 terminal for DCS are formed in a half part given by dividing the laminate 100 by a plane vertical to the mounting surface opposite to the ANT terminal.

Further, on the opposite side to the ANT terminal, on which the TX terminals and the RX terminals are formed, the transmission TX terminals are formed at one end, and the reception RX terminals are formed at the other end.

In this embodiment, the ANT terminal, the TX terminals and the RX terminals are respectively sandwiched by ground terminals. Also, VC1 and VC2 are respectively sandwiched by ground terminals.

Table 1 shows the control logic of each control circuit VC1 and VC2 for switching each mode of GSM and DCS1800 in the laminate-type, high-frequency switch module in this embodiment.

TABLE 1

| Mode | VC1 | VC2 |
| --- | --- | --- |
| GSM TX | High | Low |
| GSM RX | Low | Low |
| DCS TX | Low | High |
| DCS RX | Low | Low |

As shown in FIGS. 10–17, with the branching circuit, the high-frequency switchs and the directional coupler formed integrally in the laminate as discribed above, conventionally necessary impedance matching circuits have been made unnecessary to obtain a miniaturized, high-performance, laminate-type, high-frequency switch module excellent in insertion loss and isolation in a desired frequency band in each communication mode and having a function to detect the electric power of a transmission signal.

(2) Second Embodiment

Figure 18:
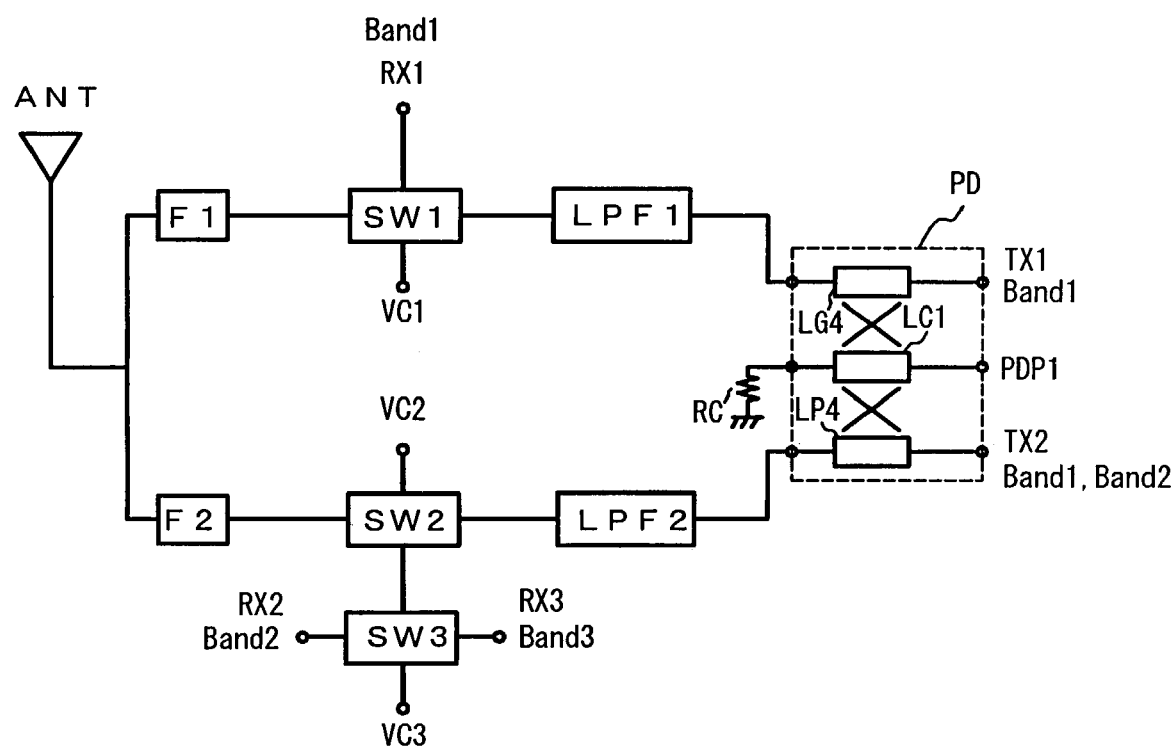
FIG. 18 is a block diagram showing another example of the laminate-type, high-frequency switch module of the present invention.
Figure 19:
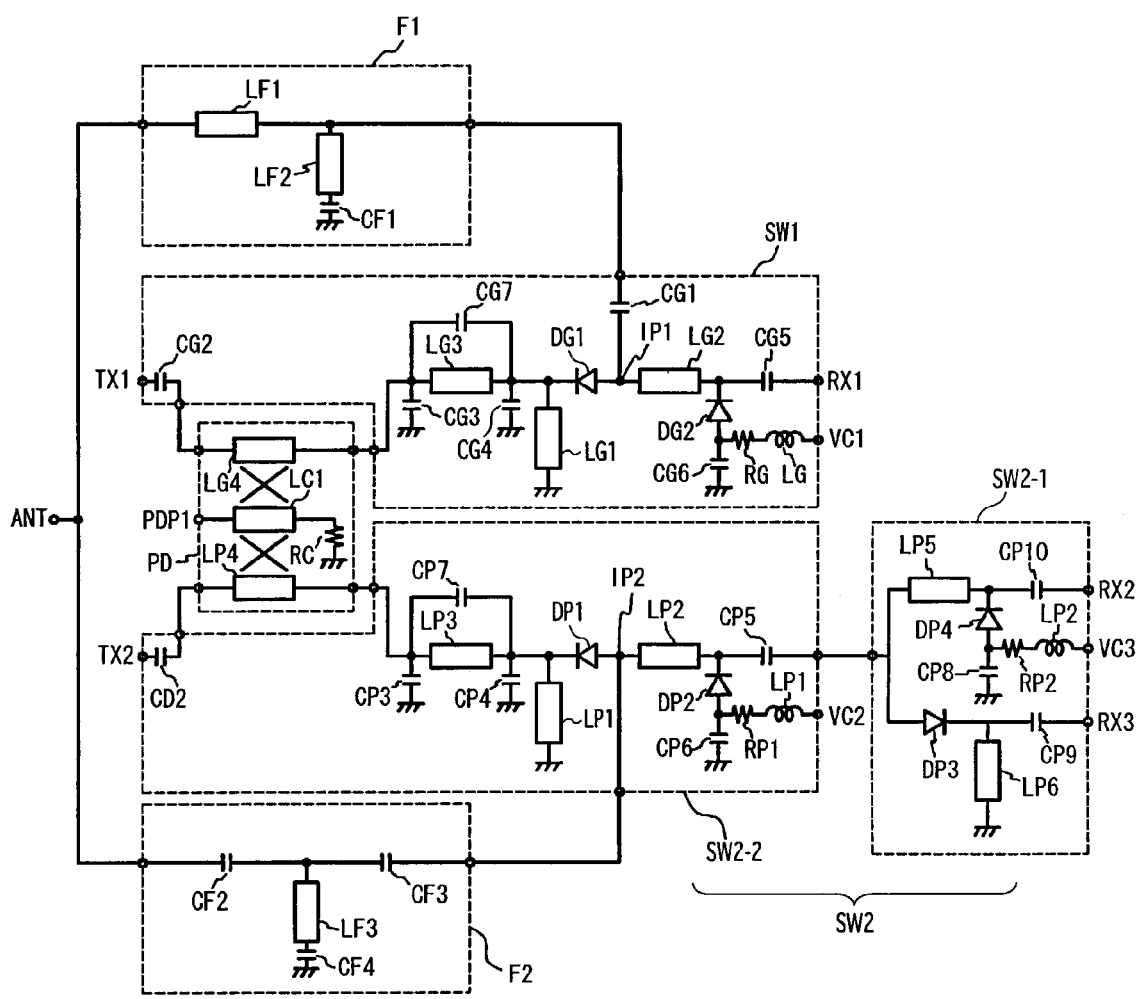
FIG. 19 is a view showing an equivalent circuit of another example of the laminate-type, high-frequency switch module of the present invention.

This embodiment relates to a triple-band, laminate-type, high-frequency switch module. FIG. 18 is a circuit block diagram showing the laminate-type, high-frequency switch module of the present invention, and FIG. 19 is a view showing one example of its equivalent circuit.

The first and second filter circuits and the first switch circuit SW1 for the first transmitting/receiving system (GSM) are the same as those in the first embodiment in terms of an equivalent circuit. The second switch circuit SW2 comprises one switch circuit SW2-1 for switching a reception circuit RX2 of the second transmitting/receiving system (DCS1800) and a reception circuit RX3 of the third transmitting/receiving system (PCS), and another switch circuit SW2-2 for switching a transmission circuit TX2 of DCS/PCS and a switch circuit SW2-1.

The switch circuit SW2-1 for switching the reception circuit RX2 of DCS and the reception circuit RX3 of PCS comprises two diodes DP3, DP4, and two distributed constant lines LP5, LP6 as main constituents. Disposed upstream of the switch circuit SW2-1 is another switch circuit SW2-2 for switching the transmission circuit TX2 of DCS/PCS and the switch circuit SW2-1. The switch circuit SW2-2 comprises two diodes DP1, DP2, and two distributed constant lines LP1, LP2 as main constituents.

Table 2 shows the control logic of each control circuit VC1, VC2 and VC3 for switching each mode of GSM, DCS and PCS in the laminate-type, high-frequency switch module in this embodiment.

TABLE 2

|        | VC1  | VC2  | VC3  |
|--------|------|------|------|
| GSM TX | High | Low  | Low  |
| DCS TX | Low  | High | Low  |
| PCS TX | Low  | High | Low  |
| GSM RX | Low  | Low  | Low  |
| DCS RX | Low  | Low  | Low  |
| PCS RX | Low  | Low  | High |

Conventionally necessary impedance matching circuits are unnecessary to obtain a miniaturized, high-performance, laminate-type, high-frequency switch module excellent in insertion loss and isolation in a desired frequency band in each communication mode and having a function to detect the electric power of a transmission signal.

(3) Third Embodiment

Figure 20:
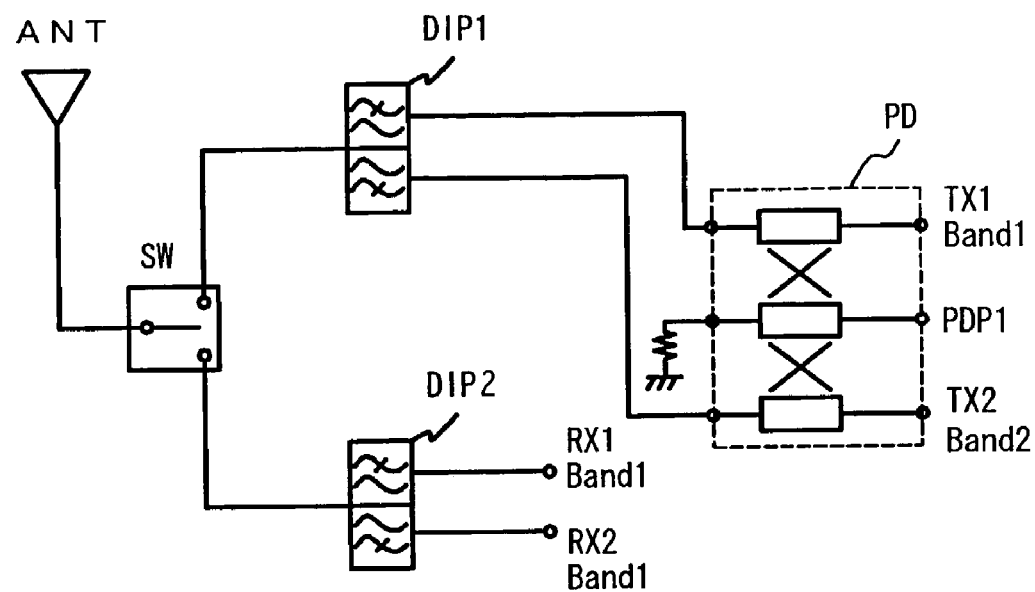
FIG. 20 is a block diagram showing a circuit of a further example of the laminate-type, high-frequency switch module of the present invention.

As shown in FIG. 20, the laminate-type, high-frequency switch module of this embodiment comprises, downstream of the antenna, a high-frequency switch (SPDT switch) SW for switching a transmission signal line and a reception signal line of two transmitting/receiving systems. It comprises two branching circuits downstream of the high-frequency switch SW, one branching circuit DIP1 being connected to the two transmitting systems TX1, TX2 to synthesize a transmission signal. The term "synthesize a transmission signal" used herein means that a transmission signal sent from one operating transmitting system among a plurality of transmitting systems TX1, TX2 is permitted to pass. Also, the other branching circuit DIP2 is connected to the two receiving systems RX1, RX2 to branch a reception signal. This laminate-type, high-frequency switch module also comprises a means PD for detecting the electric power of transmission signals sent from the transmission circuits TX1, TX2, for instance, a directional coupling circuit.

Figure 21:
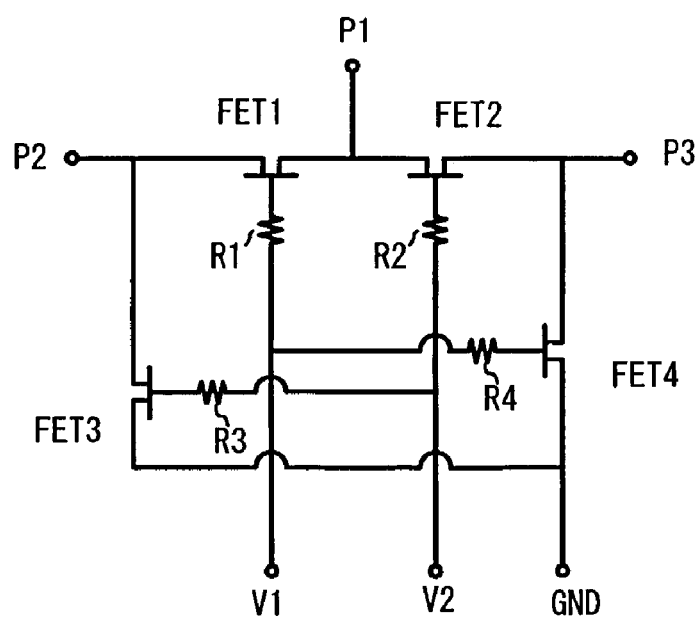
FIG. 21 is a view showing an equivalent circuit of a further example of the laminate-type, high-frequency switch module of the present invention.

As shown in FIG. 21, this high-frequency switch comprises a switch circuit constituted by four transistors FET. At the time of transmission, the transistors FET1, FET4 are in an ON state, while the transistors FET2, FET3 are in an OFF state. And at the time of reception, the transistors FET2, FET3 are in an ON state, while the transistors FET1, FET4 are in an OFF state. As a result, the transmission circuit and the reception circuit are switched. Each of the branching circuits DIP1, DIP2 is connected to the transmission circuit side and the reception circuit side. Disposed downstream of the branching circuit DIP1 on the side of the transmission circuit is a directional coupler. Like the above laminate-type, high-frequency switch module, distributed constant lines, capacitors and transistors for constituting the branching circuits, a plurality of high-frequency switch circuits and the directional coupling circuits are integrally formed in the laminate constituted by a plurality of dielectric layers.

Accordingly, conventionally necessary impedance matching circuits are unnecessary to obtain a miniaturized, high-performance, laminate-type, high-frequency switch module excellent in insertion loss and isolation in a desired frequency band in each communication mode and having a function to detect the electric power of a transmission signal.

What is claimed is:

1. A laminate-type, high-frequency switch module for switching a transmission circuit and a reception circuit in a plurality of different transmitting/receiving systems, comprising a branching circuit for branching signals of a plurality of transmitting/receiving systems; a plurality of high-frequency switch circuits for switching a signal line for passing a reception signal sent from said branching circuit to the reception circuit and a signal line for passing a transmission signal sent from the transmission circuit to the branching circuit; and a means for detecting the electric power of a transmission signal sent from said transmission circuit; said laminate being constituted by a plurality of dielectric layers having electrode patterns, and said branching circuit, said high-frequency switch circuits and said electric power-detecting means being constituted by said electrode patterns in said laminate.

2. The laminate-type, high-frequency switch module according to claim 1, wherein said high-frequency switch circuit comprises a diode, a first distributed constant line and a first capacitor as main elements; wherein said branching circuit comprises a second distributed constant line and a second capacitor as main elements; and wherein said filter circuit comprises a third distributed constant line and a third capacitor as main elements, at least part of said first to third distributed constant lines and said first to third capacitors being constituted by said electrode patterns in said laminate with said diodes mounted onto a surface of said laminate.

3. The laminate-type, high-frequency switch module claim 1, wherein said electric power-detecting means is a directional coupling circuit or a capacitance-coupling circuit.

4. The laminate-type, high-frequency switch module claim 1, comprising a filter circuit in a signal line for passing a transmission signal sent from said transmission circuit to an antenna.

5. The laminate-type, high-frequency switch module claim 1, wherein said directional coupling circuit comprises a fourth distributed constant line as a main element, at least part of said fourth distributed constant line being constituted by said electrode patterns in said laminate.

6. The laminate-type, high-frequency switch module according to claim 5, wherein said fourth distributed constant line is constituted by a main line disposed in said signal line for passing a transmission signal sent from said transmission circuit to said branching circuit, and a sub-line disposed in parallel with or in opposite to said main line.

7. The laminate-type, high-frequency switch module according to claim 6, wherein said third distributed constant line of said filter circuit is used as said main line.

8. The laminate-type, high-frequency switch module claim 1, wherein said capacitance-coupling circuit comprises a fifth capacitor as a main element, at least part of said fifth capacitor being constituted by said electrode patterns in said laminate.

9. The laminate-type, high-frequency switch module according to claim 8, wherein said fifth capacitor is disposed in parallel with said signal line of a transmission signal sent from said transmission circuit to said branching circuit.

10. The laminate-type, high-frequency switch module claim 1, comprising a high-frequency amplifier, a variable gain amplifier, and an automatic gain control circuit, which are integrated in said laminate.

11. The laminate-type, high-frequency switch module according to claim 10, wherein said automatic gain control circuit compares the electric power of a transmission signal detected by said directional coupling circuit or said capacitance-coupling circuit with electric power to be transmitted, so that the gain of said variable gain amplifier is increased or decreased based on the comparison result.

12. The laminate-type, high-frequency switch module according to claim 11, wherein said automatic gain control circuit is provided with a detector and an error amplifier, one error amplifier being shared by a plurality of transmitting/receiving systems.

13. The laminate-type, high-frequency switch module claim 10, wherein said high-frequency amplifier comprises an amplifier circuit having a transistor, an input-matching circuit connected to the input side of said amplifier circuit, and an output-matching circuit connected to the output side of said amplifier circuit, each of said input-matching circuit and said output-matching circuit comprising a capacitor and an inductor, said transistor in said amplifier circuit being mounted onto a surface of said laminate, and at least part of said inductor being formed as a distributed constant line in said laminate.

14. The laminate-type, high-frequency switch module according to claim 13, wherein at least part of said capacitor is constituted by capacitor electrodes opposing via said dielectric layer in said laminate.

15. The laminate-type, high-frequency switch module according to claim 13, wherein a transistor of said amplifier circuit is a field effect transistor.

16. A laminate-type, high-frequency switch module for switching a transmission circuit and a reception circuit in a plurality of different transmitting/receiving systems, comprising high-frequency switch circuits for switching signal lines of a plurality of transmitting/receiving systems, and, downstream of said high-frequency switch circuits, a branching circuit for branching signals of a plurality of transmitting/receiving systems, a branching circuit for synthesizing signals of a plurality of transmitting/receiving systems, and a means for detecting the electric power of a transmission signal sent from each transmission circuit, said laminate being constituted by a plurality of dielectric layers having electrode patterns, and said branching circuit, said high-frequency switch circuits and said electric power-detecting means being constituted by said electrode patterns in said laminate.

17. The laminate-type, high-frequency switch module according to claim 16, wherein said high-frequency switch circuit comprises a field effect transistor as a main element, said field effect transistor being mounted onto a surface of said laminate.

18. The laminate-type, high-frequency switch module claim 16, wherein said electric power-detecting means is a directional coupling circuit or a capacitance-coupling circuit.

19. The laminate-type, high-frequency switch module claim 16, comprising a filter circuit in a signal line for passing a transmission signal sent from said transmission circuit to an antenna.

20. The laminate-type, high-frequency switch module claim 16, wherein said directional coupling circuit comprises a fourth distributed constant line as a main element, at least part of said fourth distributed constant line being constituted by said electrode patterns in said laminate.

21. The laminate-type, high-frequency switch module according to claim 20, wherein said fourth distributed constant line is constituted by a main line disposed in said signal line for passing a transmission signal sent from said transmission circuit to said branching circuit, and a sub-line disposed in parallel with or in opposite to said main line.

22. The laminate-type, high-frequency switch module according to claim 21, wherein said third distributed constant line of said filter circuit is used as said main line.

23. The laminate-type, high-frequency switch module claim 16, wherein said capacitance-coupling circuit comprises a fifth capacitor as a main element, at least part of said fifth capacitor being constituted by said electrode patterns in said laminate.

24. The laminate-type, high-frequency switch module according to claim 23, wherein said fifth capacitor is disposed in parallel with said signal line of a transmission signal sent from said transmission circuit to said branching circuit.

25. The laminate-type, high-frequency switch module claim 16, comprising a high-frequency amplifier, a variable gain amplifier, and an automatic gain control circuit, which are integrated in said laminate.

26. The laminate-type, high-frequency switch module according to claim 25, wherein said automatic gain control circuit compares the electric power of a transmission signal detected by said directional coupling circuit or said capacitance-coupling circuit with electric power to be transmitted, so that the gain of said variable gain amplifier is increased or decreased based on the comparison result.

27. The laminate-type, high-frequency switch module according to claim 26, wherein said automatic gain control circuit is provided with a detector and an error amplifier, one error amplifier being shared by a plurality of transmitting/receiving systems.

28. The laminate-type, high-frequency switch module claim 25, wherein said high-frequency amplifier comprises an amplifier circuit having a transistor, an input-matching connected to the input side of said amplifier circuit, and an output-matching circuit connected to the output side of said amplifier circuit, each of said input-matching circuit and said output-matching circuit comprising a capacitor and an inductor, said transistor in said amplifier circuit being mounted onto a surface of said laminate, and at least part of said inductor being formed as a distributed constant line in said laminate.

29. The laminate-type, high-frequency switch module according to claim 28, wherein at least part of said capacitor is constituted by capacitor electrodes opposing via said dielectric layer in said laminate.

30. The laminate-type, high-frequency switch module according to claim 28 wherein a transistor of said amplifier circuit is a field effect transistor.

* * * * *

UNITED STATES PATENT AND TRADEMARK OFFICE
CERTIFICATE OF CORRECTION

| | |
|---|---|
| PATENT NO. | : 7,027,779 B2 |
| APPLICATION NO. | : 10/362233 |
| DATED | : April 11, 2006 |
| INVENTOR(S) | : Hirouki Tai et al. |

It is certified that error appears in the above-identified patent and that said Letters Patent is hereby corrected as shown below:

Column 16, lines 39-40, "module claim" should read --module according to claim--.

Column 16, lines 43-44, "module claim" should read --module according to claim--.

Column 16, lines 47-48, "module claim" should read --module according to claim--.

Column 16, lines 61-62, "module claim" should read --module according to claim--.

Column 17, lines 3-4, "module claim" should read --module according to claim--.

Column 17, lines 19-20, "module claim" should read --module according to claim--.

Column 17, lines 58-59, "module claim" should read --module according to claim--.

Column 17, lines 62-63, "module claim" should read --module according to claim--.

Column 18, lines 1-2, "module claim" should read --module according to claim--.

Column 18, lines 16-17, "module claim" should read --module according to claim--.

Column 18, lines 27-28, "module claim" should read --module according to claim--.

Column 18, lines 45-46, "module claim" should read --module according to claim--.

UNITED STATES PATENT AND TRADEMARK OFFICE
CERTIFICATE OF CORRECTION

PATENT NO. : 7,027,779 B2
APPLICATION NO. : 10/362233
DATED : April 11, 2006
INVENTOR(S) : Hirouki Tai et al.

It is certified that error appears in the above-identified patent and that said Letters Patent is hereby corrected as shown below:

Column 18, lines 47-48, "input-matching connected" should read --input-matching circuit connected--.

Column 18, line 61, "claim 28" should read --claim 28,--.

Signed and Sealed this

Twenty-sixth Day of September, 2006

JON W. DUDAS
*Director of the United States Patent and Trademark Office*